US010839822B2

(12) United States Patent
Chen et al.

(10) Patent No.: US 10,839,822 B2
(45) **Date of Patent: *Nov. 17, 2020**

(54) MULTI-CHANNEL SPEECH SEPARATION

(71) Applicant: Microsoft Technology Licensing, LLC, Redmond, WA (US)

(72) Inventors: Zhuo Chen, Kirkland, WA (US); Jinyu Li, Redmond, WA (US); Xiong Xiao, Bellevue, WA (US); Takuya Yoshioka, Bellevue, WA (US); Huaming Wang, Clyde Hill, WA (US); Zhenghao Wang, Bellevue, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,106

(22) Filed: Nov. 6, 2017

(65) Prior Publication Data

US 2019/0139563 A1 May 9, 2019

(51) Int. Cl.
*G10L 21/0216* (2013.01)
*G10L 21/0272* (2013.01)
(Continued)

(52) U.S. Cl.
CPC ........ *G10L 21/0216* (2013.01); *G06N 3/0445* (2013.01); *G06N 3/0454* (2013.01);
(Continued)

(58) Field of Classification Search
USPC ................................ 704/226–228, 232, 233
See application file for complete search history.

(56) References Cited

U.S. PATENT DOCUMENTS 8,223,988 B2 * 7/2012 Wang .................... G10L 21/028 381/111
9,368,110 B1 6/2016 Hershey et al.
(Continued)

OTHER PUBLICATIONS

Allen, et al., "Image Method for Efficiently Simulating Small-Room Acoustics", In Journal of the Acoustical Society of America, vol. 65, Issue 4, Apr. 1979, 8 Pages.
(Continued)

*Primary Examiner* — Leonard Saint Cyr
(74) *Attorney, Agent, or Firm* — Medley, Behrens & Lewis, LLC

(57) ABSTRACT

Representative embodiments disclose mechanisms to separate and recognize multiple audio sources (e.g., picking out individual speakers) in an environment where they overlap and interfere with each other. The architecture uses a microphone array to spatially separate out the audio signals. The spatially filtered signals are then input into a plurality of separators, so each signal is input into a corresponding signal. The separators use neural networks to separate out audio sources. The separators typically produce multiple output signals for the single input signals. A post selection processor then assesses the separator outputs to pick the signals with the highest quality output. These signals can be used in a variety of systems such as speech recognition, meeting transcription and enhancement, hearing aids, music information retrieval, speech enhancement and so forth.

20 Claims, 13 Drawing Sheets

(51) Int. Cl.

| | |
|---|---|
| ***G06N 3/04*** | (2006.01) |
| ***G06N 3/08*** | (2006.01) |
| ***G10L 25/30*** | (2013.01) |
| *G10L 21/0308* | (2013.01) |
| *H04R 3/00* | (2006.01) |
| *G10L 21/0208* | (2013.01) |

(52) U.S. Cl.

CPC .......... *G06N 3/084* (2013.01); *G10L 21/0272* (2013.01); *G10L 25/30* (2013.01); *G10L 21/0308* (2013.01); *G10L 2021/02087* (2013.01); *G10L 2021/02166* (2013.01); *H04R 3/005* (2013.01); *H04R 2430/20* (2013.01)

(56) References Cited

U.S. PATENT DOCUMENTS

| | | | | |
|---|---|---|---|---|
| 9,685,155 | B2 | 6/2017 | Hershey et al. | |
| 10,090,001 | B2 * | 10/2018 | Theverapperuma .... | G10L 25/30 |
| 2006/0056647 | A1 | 3/2006 | Ramakrishnan et al. | |
| 2009/0089053 | A1 * | 4/2009 | Wang ...................... | G10L 25/78<br>704/233 |
| 2009/0279715 | A1 * | 11/2009 | Jeong ..................... | H04R 3/005<br>381/92 |
| 2015/0095026 | A1 | 4/2015 | Bisani et al. | |
| 2015/0269933 | A1 | 9/2015 | Yu et al. | |
| 2017/0061978 | A1 | 3/2017 | Wang et al. | |
| 2017/0162194 | A1 | 6/2017 | Nesta et al. | |
| 2017/0278513 | A1 * | 9/2017 | Li ........................... | G10L 15/16 |
| 2018/0033449 | A1 * | 2/2018 | Theverapperuma .... | G10L 25/30 |
| 2018/0277137 | A1 * | 9/2018 | Elko ...................... | H04R 1/406 |
| 2020/0128322 | A1 | 4/2020 | Sabin et al. | |

OTHER PUBLICATIONS

Bregman, Albert S., "Auditory scene analysis: The perceptual organization of sound", In Journal of the Acoustical Society of America, Jan. 1990, pp. 1-9.

Brown, et al., "Computational auditory scene analysis", In Proceedings of Computer Speech & Language, vol. 8, No. 4, Oct. 1994, pp. 297-336.

Chen, et al., "Deep attractor network for single-microphone speaker separation", In Proceedings of IEEE International Conference on Acoustics, Speech and Signal Processing, Mar. 5, 2017, 5 Pages.

Chen, et al., "Speech enhancement and recognition using multi-task learning of long-short term memory recurrent neural network", In Proceedings of International Speech Communication Association, Sep. 6, 2015, 5 Pages.

Chen, et al., "Speaker-independent speech separation with deep attractor network", In Journal of Computing Research Repository, Jul. 2017, pp. 1-10.

Chen, et al., "Speech enhancement by sparse, low-rank, and dictionary spectrogram decomposition", In Proceedings of IEEE Applications of Signal Processing to Audio and Acoustics, Oct. 20, 2013, 4 Pages.

Cherry, Colin E., "Some experiments on the recognition of speech, with one and with two ears", In Journal of the acoustical society of America, vol. 25, No. 5, Sep. 1953, pp. 975-979.

Delcroix, et al., "Speech recognition in the presence of highly non-stationary noise based on spatial, spectral and temporal speech/noise modeling combined with dynamic variance adaptation", In Proceedings of Workshop on Machine Listening in Multisource Environments, Sep. 1, 2011, pp. 12-17.

Elko, et al., "Microphone Arrays", In Publication of Springer, 2008. 21 pages.

Ephraim, et al., "Speech enhancement using a minimum mean-square error log-spectral amplitude estimator", In Journal of IEEE Transactions on Acoustics, Speech, and Signal Processing, vol. 33, No. 2, Apr. 1985, pp. 443-445.

Févotte, et al., "Notes on nonnegative tensor factorization of the spectrogram for audio source separation: statistical insights and towards self-clustering of the spatial cues", In Journal of International Symposium on Computer Music Modeling and Retrieval., Jun. 21, 2010, pp. 102-115.

Fevotte, et al., "BSS EVAL Toolbox User Guide Revision 2.0", In Technical Report, Apr. 2005, 22 Pages.

Gary, Elko W., "Differential Microphone Arrays", In Publication of Springer, Mar. 31, 2004, pp. 11-65.

Hershey, et al., "Deep clustering: Discriminative embeddings for segmentation and separation", In Proceedings of IEEE International Conference on Acoustics, Speech and Signal Processing, Mar. 20, 2016, pp. 31-35.

Heymann, et al., "Neural network based spectral mask estimation for acoustic beamforming", In Proceedings of International Conference on Acoustics, Speech and Signal Processing, Mar. 20, 2016, 5 Pages.

Hinton, et al., "Deep Neural Networks for Acoustic Modeling in Speech Recognition: The Shared Views of Four Research Groups", In Proceedings of the IEEE Signal Processing Magazine, vol. 29, Issue 6, Nov. 2012, pp. 82-97.

Isik, et al., "Single-channel multi-speaker separation using deep clustering", In Journal of Computing Research Repository, Jul. 2016, 5 Pages.

Ito, et al., "Permutation-free convolutive blind source separation via full-band clustering based on frequency-independent source presence priors", In Proceedings of IEEE International Conference on Acoustics, Speech and Signal Processing, May 26, 2013.

Jaitly, et al., "Application of Pretrained Deep Neural Networks to Large Vocabulary Speech Recognition", In Proceedings of 13th Annual Conference of the International Speech Communication Association, Sep. 9, 2012, 4 Pages.

Li, et al., "Improving Wideband Speech Recognition Using Mixed-Bandwidth Training Data in CD-DNN-HMM", In Proceedings of IEEE Spoken Language Technology Workshop, Dec. 2, 2012, pp. 131-136.

Li, et al., "Large-scale domain adaptation via teacher-student learning", In Journal of the Computing Research Repository, Aug. 2017, 5 Pages.

Li, et al., "Learning small-size DNN with output-distribution-based criteria", In Proceedings of 15th Annual Conference of the International Speech Communication Association, Sep. 14, 2014, pp. 1910-1914.

Miao, et al., "Simplifying long short-term memory acoustic models for fast training and decoding", In Proceedings of IEEE International Conference on Acoustics, Speech and Signal Processing, Mar. 20, 2016, pp. 2284-2288.

Mohammadiha, et al., "Supervised and unsupervised speech enhancement using nonnegative matrix factorization", In Journal of IEEE Transactions on Audio, Speech, and Language Processing, vol. 21, No. 10, Oct. 2013, pp. 1-12.

Narayanan, et al., "Ideal Ratio Mask Estimation Using Deep Neural Networks for Robust Speech Recognition", In Proceedings of IEEE International Conference on Acoustics, Speech and Signal Processing, May 26, 2013, pp. 7092-7096.

Smaragdis, Paris, "Blind separation of convolved mixtures in the frequency domain", In Journal of Neurocomputing, vol. 22, No. 1-3, Nov. 20, 1998, 8 Pages.

Sainath, et al., "Making Deep Belief Networks Effective for Large Vocabulary Continuous Speech Recognition", In Proceedings of IEEE Workshop on Automatic Speech Recognition and Understanding, Dec. 11, 2011, 6 Pages.

Sainath, et al., "Multichannel signal processing with deep neural networks for automatic speech recognition", In Journal of IEEE/ACM Transactions on Audio, Speech, and Language Processing, vol. 25, No. 5, May 2017, pp. 1-15.

Sawada, et al., "A robust and precise method for solving the permutation problem of frequency-domain blind source separation", In Journal of IEEE Transactions on Speech and Audio Processing, vol. 12, No. 5, Sep. 2004, pp. 1-9.

Sawada, et al., "Underdetermined convolutive blind source separation via frequency bin-wise clustering and permutation alignment", In Journal of IEEE Transactions on Audio, Speech, and Language Processing, vol. 19, No. 3, Mar. 2011, pp. 516-527.

(56) References Cited

OTHER PUBLICATIONS

Seide, et al., "Conversational Speech Transcription using Context-Dependent Deep Neural Networks", In Proceedings of the 12th Annual Conference of the International Speech Communication Association, Aug. 28, 2011, pp. 437-440.
Sak, et al., "Long short-term memory recurrent neural network architectures for large scale acoustic modeling", In Proceedings of Fifteenth Annual Conference of the International Speech Communication Association, Sep. 14, 2014, pp. 338-342.
Van Veen, et al., "Beamforming: A versatile approach to spatial filtering", In Journal of IEEE ASSP Magazine, vol. 5, No. 2, Apr. 1988, pp. 4-24.
Vu, et al., "Blind speech separation employing directional statistics in an expectation maximization framework", In Proceedings of IEEE International Conference on Acoustics Speech and Signal Processing, Mar. 14, 2010, pp. 241-244.
Wang, et al., "Computational auditory scene analysis: Principles, algorithms, and applications", In Publication of Wiley-IEEE press, Sep. 2006.
Wang, et al., "On training targets for supervised speech separation", In Journal of IEEE/ACM Transactions on Audio, Speech and Language Processing, vol. 22, No. 12, Dec. 2014, pp. 1849-1858.
Xiao, et al., "Deep beamforming networks for multi-channel speech recognition", In Proceedings of IEEE International Conference on Acoustics, Speech and Signal, Mar. 20, 2016, 5 Pages.
Xiao, et al., "On time-frequency mask estimation for mvdr beamforming with application in robust speech recognition", In Proceedings of IEEE International Conference on Acoustics, Speech and Signal Processing, Mar. 5, 2017, pp. 3246-3250.
Xue, et al., "Restructuring of Deep Neural Network Acoustic Models with Singular Value Decomposition", In Proceedings of the 14th Annual Conference of the International Speech Communication Association, Aug. 25, 2013, pp. 2365-2369.
Yu, et al., "Permutation invariant training of deep models for speaker-independent multi-talker speech separation", In Proceedings of IEEE International Conference on Acoustics, Speech and Signal Processing, Mar. 5, 2017, pp. 1-9.
Yu, et al., "Recent progresses in deep learning based acoustic models", In IEEE/CAA Journal of Automatica Sinica, vol. 4, No. 3, Jul. 11, 2017, pp. 400-413.
Chen, et al., "Improving mask learning based speech enhancement system with restoration layers and residual connection", In Proceedings of 17th Annual Conference of the International Speech Communication Association, Aug. 20, 2017, pp. 3632-3636.
Chen, Zhuo, et al., "Cracking the cocktail party problem by multi-beam deep attractor network", In proceedings of IEEE Automatic Speech Recognition and Understanding Workshop (ASRU), Dec. 16, 2017, pp. (437-444).
Dong Yu, et al., "Permutation invariant training of deep models for speaker-independent multi-talker speech separation", In Proceedings of IEEE International Conference on Acoustics, Speech and Signal Processing (ICASSP),Mar. 5, 2017., pp. ( 241-245).
"International Search Report and Written Opinion Issued in PCT Application No. PCT/US18/058067", dated Jan. 29, 2019, 14 Pages.
"Non Final Office Action Issued in U.S. Appl. No. 15/991,988", dated Jul. 9, 2020, 12 Pages.
Qian et al., "Single-Channel Multi-talker Speech Recognition with Permutation Invariant Training", In journal of Computing Research Repository, Jul. 19, 2017, 11 Pages.

* cited by examiner

MULTI-CHANNEL SPEECH SEPARATION

FIELD

This application relates generally to separating out speech from multiple speakers. More specifically, this application relates to separating speech from multiple speakers using multiple channel separation architectures.

BACKGROUND

To date little success has been achieved in cracking the so-called cocktail party problem. This problem is one of the most difficult challenges in audio signal processing for more than 60 years. In this problem, the task is to separate and recognize each speaker in highly overlapped speech environment, such as might occur at a cocktail party. While humans seem to be able to solve this problem naturally without much effort, audio processing systems have been unable to produce satisfactory results. This is because of the large variation in mixing sources.

It is within this context that the present embodiments arise.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Embodiments of the present disclosure present mechanisms for solving the cocktail party problem where multiple overlapping speakers exist and the goal is to separate out each speaker so the system can identify each speaker and work with the individual speakers in some fashion. More generally, the embodiments separate and/or recognize all sound components in an arbitrary environment.

Embodiments are useful in such environments as hearing aids, meeting transcription/diarization, music information retrieval and others. Thus, the audio separators of the present disclosure can be utilized in a wide variety of environments.

Embodiments can comprise a microphone array coupled to a beamforming network to perform spatial filtering. The output of each beamformed channel is passed through a source separator, which performs spectral filtering to separate out different audio sources. The source separators can comprise a machine learning algorithm that utilizes a ratio mask learned for each participating source. The source separators can output one or more channels, which will be related to the audio sources.

In some embodiments, a post selection process occurs to select the top C channels that correspond to the C audio sources. The post selection can utilize spectral clustering, speech quality detection (for audio sources containing speech), and other mechanisms to select those channels with the best quality audio corresponding to the audio sources.

DESCRIPTION

Figure 1:
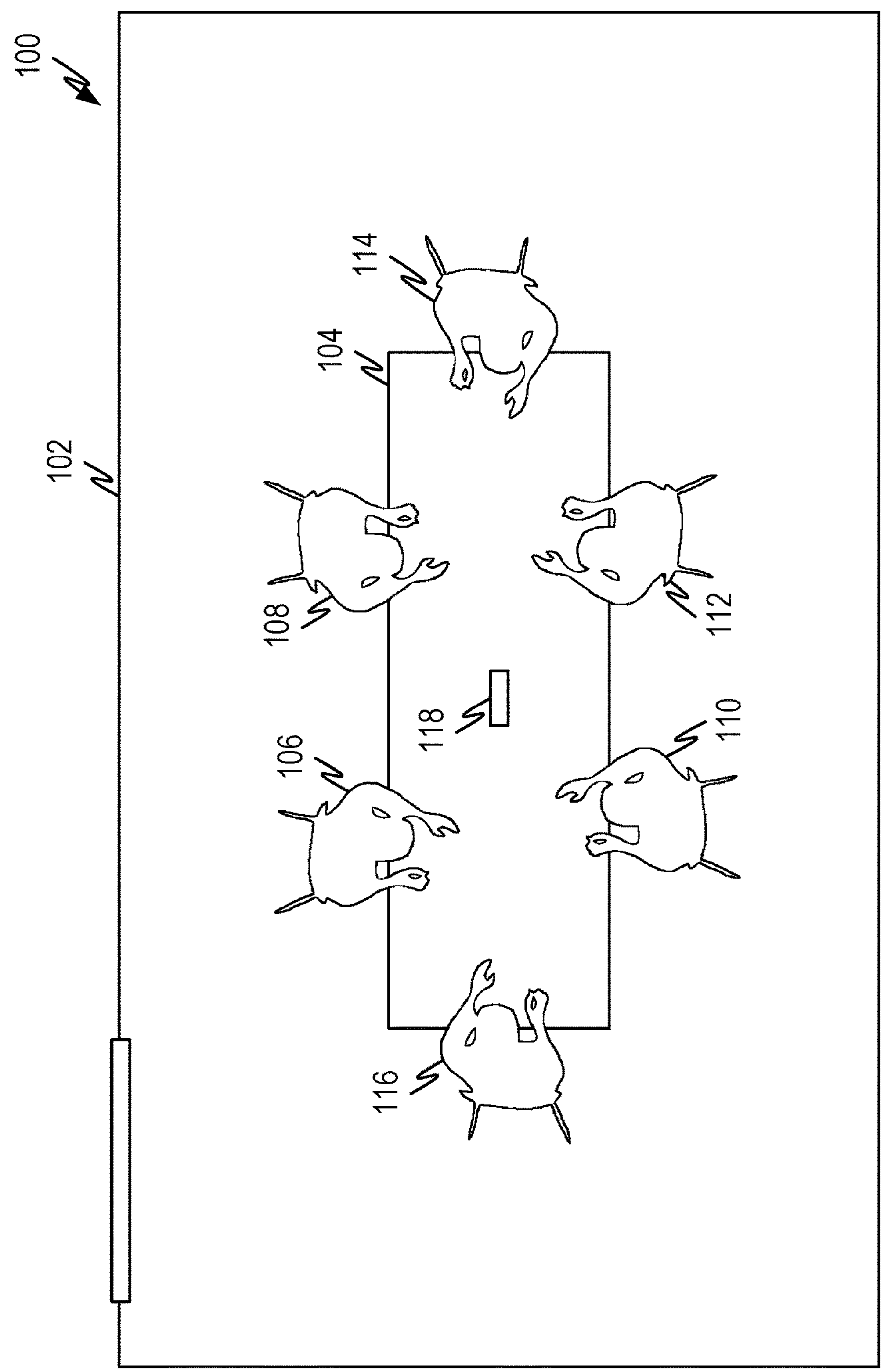
FIG. 1 illustrates an example environment where an audio processing system can be used to recognize multiple remote speakers according to some aspects of the present disclosure.

FIG. 1 illustrates an example environment 100 where an audio processing system can be used to recognize multiple remote speakers according to some aspects of the present disclosure. This example comprises a plurality of speakers (106, 108, 110, 112, 114, 116) in a conference room 102 in a meeting or other such gathering. The table 104 utilized by the speakers has an audio separator 118 according to some aspects of the present disclosure.

In such an environment 100, speakers tend to overlap and the audio picked up by the audio separator 118 can be mixed and confused.

As discussed below, the audio separator 118 can utilize a microphone array and a beamformer to produce directional beams, each having a particular look direction, that help separate out the various speakers into spatially filtered channels, represented by the directional beams. In the context of this disclosure look direction, beam direction, or more simply direction (as applied to directional audio beams) mean the direction (as measured from some origin) of a directional beam. This results in a situation where speakers are likely to be represented in one beam more than another. With fixed beamforming this is not necessarily guaranteed, although for relatively fixed environments like a conference room with a limited number of chairs, design of the microphone array and beamformer can increase the likelihood. For audio sources that are relatively fixed spatially, dynamic beamforming can be used to place beams toward audio sources as is known in the art. However, this is not necessary for embodiments of the present disclosure to function well.

Although FIG. 1 illustrates an environment of a conference room, embodiments of the present disclosure can be utilized in any environment where multiple audio sources exist. Representative examples include, but are not limited to: multiple users are participating in an activity (playing a game, working on a white board, and so forth) and speaking at the same time; an orchestra or other group with multiple instruments where it is desired to isolate one or more of the instruments; multiple speakers where it is desired to isolate one or more speakers; and/or any other environment where multiple audio sources exist and it is desired to isolate one or more of the audio sources. Uses in the representative environments can include, but are not limited to: speech recognition of one or more speakers; identification of an audio source (e.g., identity of a speaker, a type of instrument, and so forth); amplification and/or isolation of an audio source such as would be useful in a hearing aid or other systems; speech enhancement; music identification and/or information retrieval; meeting transcription (e.g., create a transcription of a meeting or any other environment where multiple speakers reside); and many other uses.

Returning to FIG. 1, in such a meeting environment, the system can be used to identify who is speaking, recognize the speech and use the recognized speech to perform other operations (e.g., recognize commands for a digital assistant or other system), transcribe the meeting, and so forth.

Figure 2:
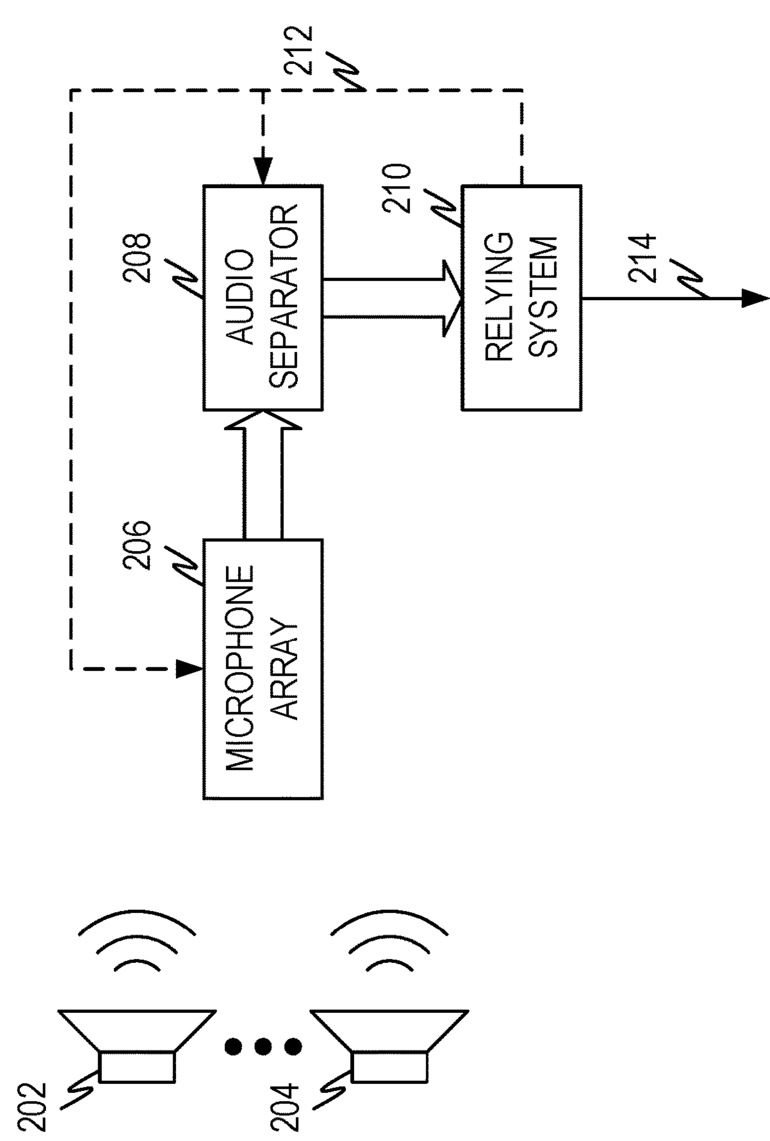
FIG. 2 illustrates a representative arrangement to recognize multiple audio sources according to some aspects of the present disclosure.

FIG. 2 illustrates a representative arrangement 200 to recognize multiple audio sources according to some aspects of the present disclosure. The arrangement comprises a plurality of audio sources 202, 204 that are to be recognized and/or separated from each other for further purposes.

The system utilizes a microphone array 206. In the context of this disclosure a microphone array 206 comprises a plurality of microphones with spatial separation between the microphones. The particular design of the microphone array can depend upon various factors such as the environment where the system is employed, the shape of the room (if any) where the system is employed, the materials used in the construction of the room (if any) where the system is employed (i.e., the degree to which the materials acoustically reflective and/or acoustically absorptive), the number and possible location of audio sources 202, 204, and so forth.

When coupled with a beamformer (not shown), the microphone array can be used to create audio beams to spatially filter the audio sources and create a plurality of audio channels which carry audio derived to one or more audio beams. Due to the separation between the audio sources 202, 204 and the separation created by various audio beams, some audio sources will be attenuated in an audio channel created by the audio beam while other sources remain unattenuated and/or amplified in the same audio channel. The amount of attenuation and/or amplification depends on the relative location of the audio source and the characteristics (location, main lobe, side lobes, roll off, and so forth) of the audio beam. The number, direction, and characteristics of the audio beams depend on the microphone array 206 and the beamformer used. The number of audio channels also depend upon these factors as well as other factors.

The beamformer can be part of the microphone array 206 or can be part of the audio separator 208. Either way, the audio separator 208 takes the plurality of audio channels created by the microphone array 206 and beamformer and produces one or more outputs that contain the separated audio sources. In a representative example, the audio sources 202, 204 can represent four human speakers and the outputs from the audio separator 208 comprises four channels with separated audio, each carrying the speech of one of the four human speakers. In another representative example, the audio sources 202, 204 represent several musical instruments and the outputs from the audio separator 208 comprises one channel for each instrument of interest.

The output of the audio separator 208 can be input into another system 210 to further process the separated audio and/or perform other functions based on the separated audio. For example, if the audio sources 202, 204 are human speakers and the output of the audio separator 208 comprises an audio channel for each speaker, the relying system 210 can take the output and accomplish various tasks.

In one representative example, the relying system can be a system that suppresses or filters out audio sources except for one or more that are of interest. For example, users of hearing aids have a very difficult time picking out one voice in a room full of talking people. In such an environment, the audio separator can pass an audio source of interest to a hearing aid or other personal device of a user.

Figure 3:
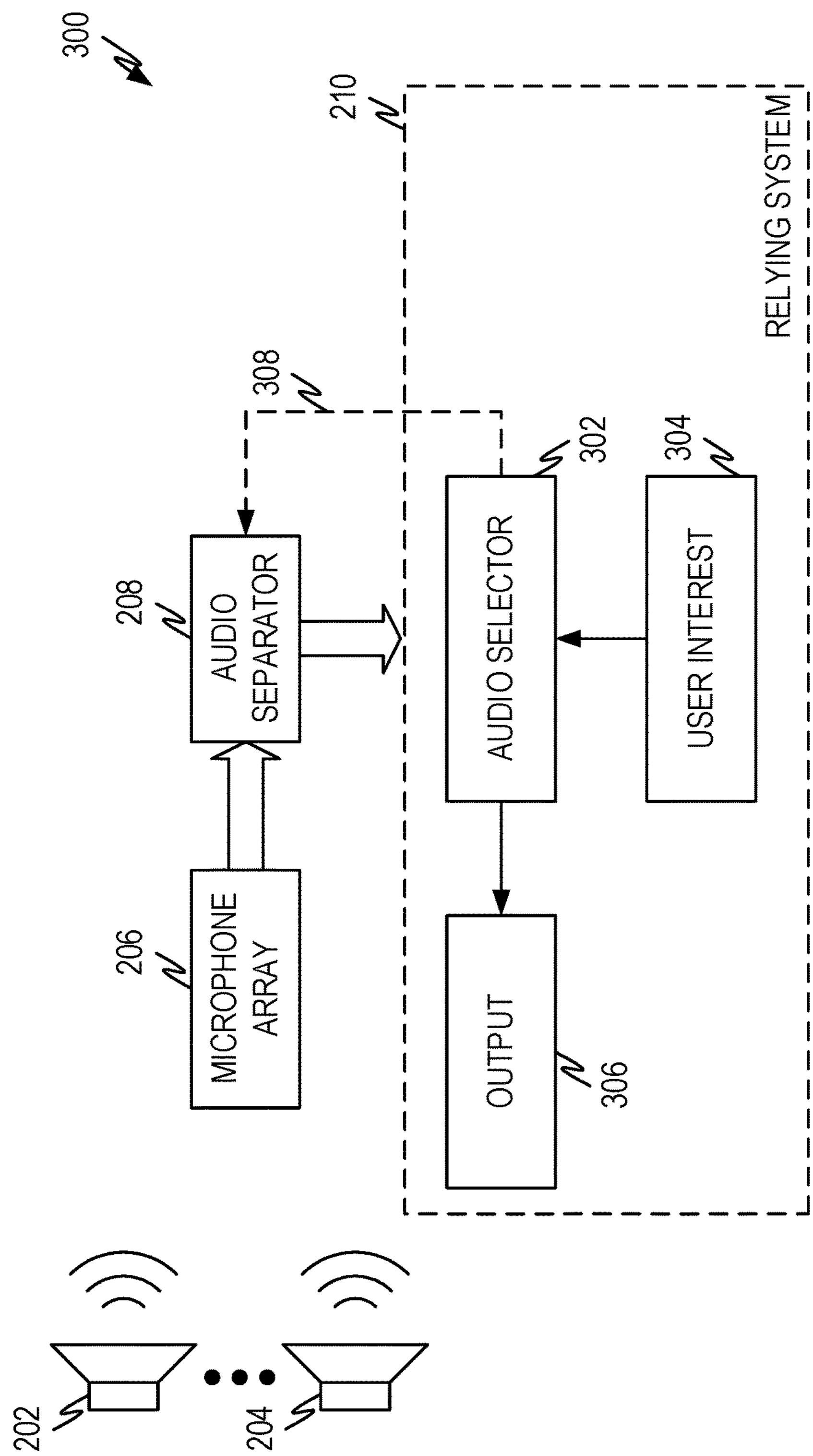
FIG. 3 illustrates a representative arrangement to utilize the audio separator of the present disclosure to filter out a speaker or other audio of interest according to some aspects of the present disclosure.

FIG. 3 illustrates a representative architecture of such a system. As in other embodiments described herein, various of the illustrated aspects can be combined in different ways or can be implemented either on one or more local devices, server systems, cloud services, and/or any combination thereof.

In this representative architecture, the relying system 210 identifies an audio source of interest and selects the appropriate audio source from the audio separator 208 and sends the selected audio to a user. Thus, the microphone array 206 and audio separator 208 process the mixed audio and produce audio from one or more sources 202, 204, and so forth.

The relying system 210 identifies an audio source of interest to a user as indicated by user interest process 304. This can be accomplished in a number of ways. For example, a wearable or other user system may identify where a user is looking or an audio source of interest. A wearable, such as glasses, watch and so forth, or a different mobile device can ascertain the orientation of the user (e.g., which direction a user is facing) and correlate that orientation with one or more of the directional audio beams of the microphone array 206. Additionally, or alternatively, the user can point a device, such as a mobile phone or other device (e.g., wearable that has a microphone) that can pick up audio and device can collect a sample of audio based on where the user points the device. Such an audio sample can be collected and processed by the user interest process 304.

Once the direction, audio sample and/or other indicator of user interest has been obtained, the audio selector 302 can use the information to determine which of the separated audio sources should be passed to the user. For example, the audio sample can be correlated (e.g., time characteristics, frequency characteristics, and/or other audio characteristics) with audio coming from the audio separator 208 and based on correlation the appropriate audio selected and passed to the user. Additionally, or alternatively, the audio selector can provide information back to the audio separator 208 and/or microphone array 206 as indicated by dashed line 308 to help the microphone array 206 and/or audio separator 208 produce the audio source of interest.

Once the appropriate audio source is selected by audio selector 302, the appropriate audio is output to the user as indicated by output 306.

The same or a similar architecture can be used where clarity of a single speaker and/or other audio source is of interest, such as separating out a particular musical instrument in an orchestra/band, separating out movie dialog from background sounds, and so forth.

In another representative example where the relying system 210 is a digital assistant, such as Cortana®, Alexa®, Siri®, Google I/O®, or other such system. When the relying system is a digital assistant, the microphone array 206 and/or audio separator 208 can be incorporated as part of any existing digital assistant architecture. How this is incorporated will typically be evident from the architecture. The microphone array 206 will be placed in a device or other housing that is located to pick up user's speech. For example, Alexa® devices are typically depicted as being placed on a piece of furniture in a room. As another example, Cortana® or other digital assistants can be part of such a room device, be part of a vehicle (such as a car or motorcycle), a tablet, phone, wearable, or other device, and so forth. The audio separator 208 is typically placed in the digital assistant architecture before the speech recognition portion so that the output(s) of the audio separator 208 are used as input into the speech recognition portion of the digital assistant. Thus the microphone array 206 and/or the audio separator 208 can be integrated into the digital assistant or can be a "front end" system to the digital assistant.

Figure 4:
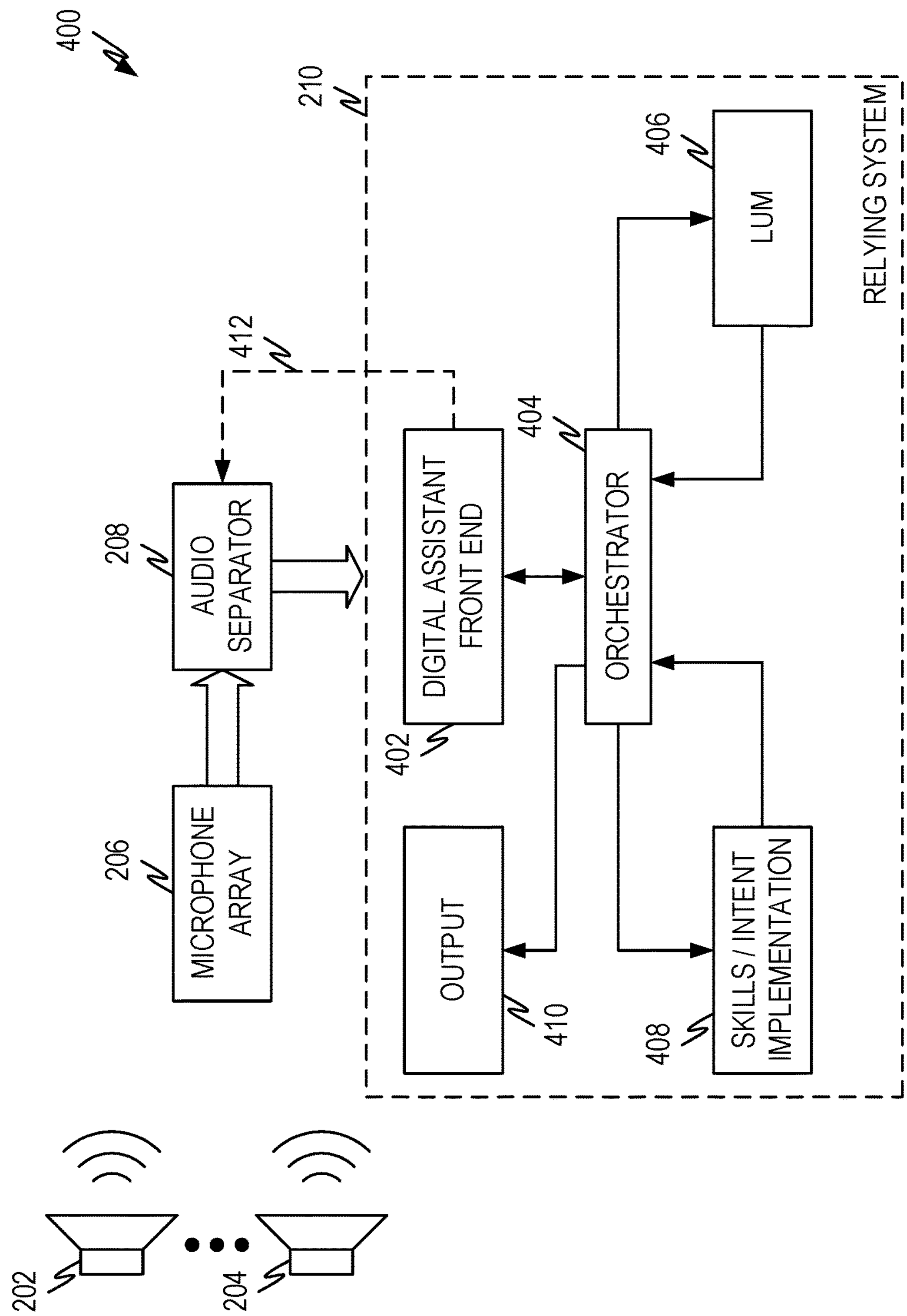
FIG. 4 illustrates a representative arrangement to utilize the audio separator of the present disclosure in conjunction with a digital assistant according to some aspects of the present disclosure.

FIG. 4 shows an example architecture of where relying system 210 is a digital assistant. The audio sources 202, 204 are multiple human speakers. The microphone array 206 produces audio signals that are processed by the audio separator 208 as described herein to produce one or more separated audio sources. These are provided to the digital assistant (e.g., relying system 210).

The audio sources from audio separator 208 are presented to the digital assistant (i.e., relying system 210 in FIG. 4) and received by, for example, the digital assistant front end 402. The front end 402 can do any pre-processing on the separated audio prior to speech recognition and intent detection. For example, where there are multiple speakers the digital assistant may be set up to give priority of one speaker over another. Such a situation can, for example, give priority to a parent over a child, a meeting organizer over meeting participants, and so forth where multiple individuals speak at the same time. As another example, perhaps the digital assistant is set up with a hierarchy of speakers so that potential speakers are given a hierarchy ranking. The front end 402 can select the highest priority speaker and pass appropriate audio to the orchestrator 404. This can be done, for example, by correlating audio samples associated with each speaker to the separated audio output from audio separator 208 and selecting the audio that corresponds to the highest priority speaker. Additionally, or alternatively, a setup process may allow the speakers to self-identify and the system can capture a hierarchy ranking associated with each speaker. Other approaches are also possible.

Additionally, or alternatively, the front end 402 can provide information back to the audio separator 208 and/or microphone array 206 as illustrated by dashed line 412. This may be helpful, for example, in helping the appropriate audio source be separated out by the microphone array 206 and/or audio separator 208.

The orchestrator 404 orchestrates all the processes of the digital assistant and effectuates the user's intent. Thus, the audio from the front end 402 is passed by the orchestrator 404 to a language understanding model 406. The language understanding model 406 performs a speech to text conversation and from the audio extracts one or more user intents. An intent is something the user wants to accomplish via the digital assistant. The intent is passed back to the orchestrator 404, which passes the intent to the appropriate skills/intent implementation 408 to effectuate the user intent. The skills/intent implementation 408 is what actually performs what the user wants such as "tell me the height of Mt. Everest" or "order me dinner from that little Chinese place around the corner" or any other user intent.

Output, status, feedback, and/or other information is sent from the skills/intent implementation 408 to the orchestrator 404, which can send it to the output process 410. The output process 410 performs and post processing on the output from the skills/intent implementation 408 and selects an appropriate channel to send the output back to the user (such as audio, visual, and so forth).

In a further representative example using human speakers as the audio sources 202, 204, the relying system 210 can be a transcription system. For example, the human speakers may be holding a meeting, be the participants of a negotiation, be parties involved in a legal proceeding or other situation where a transcription of the meeting, negotiation, proceeding, and so forth is needed. Because the different speakers have their own audio channel, the transcription system can speech recognize (i.e., speech to text) each channel and then produce a transcription where what is spoken is labeled by each different speaker. Thus, an automatic transcription labeled by speaker can be produced 214.

Figure 5:
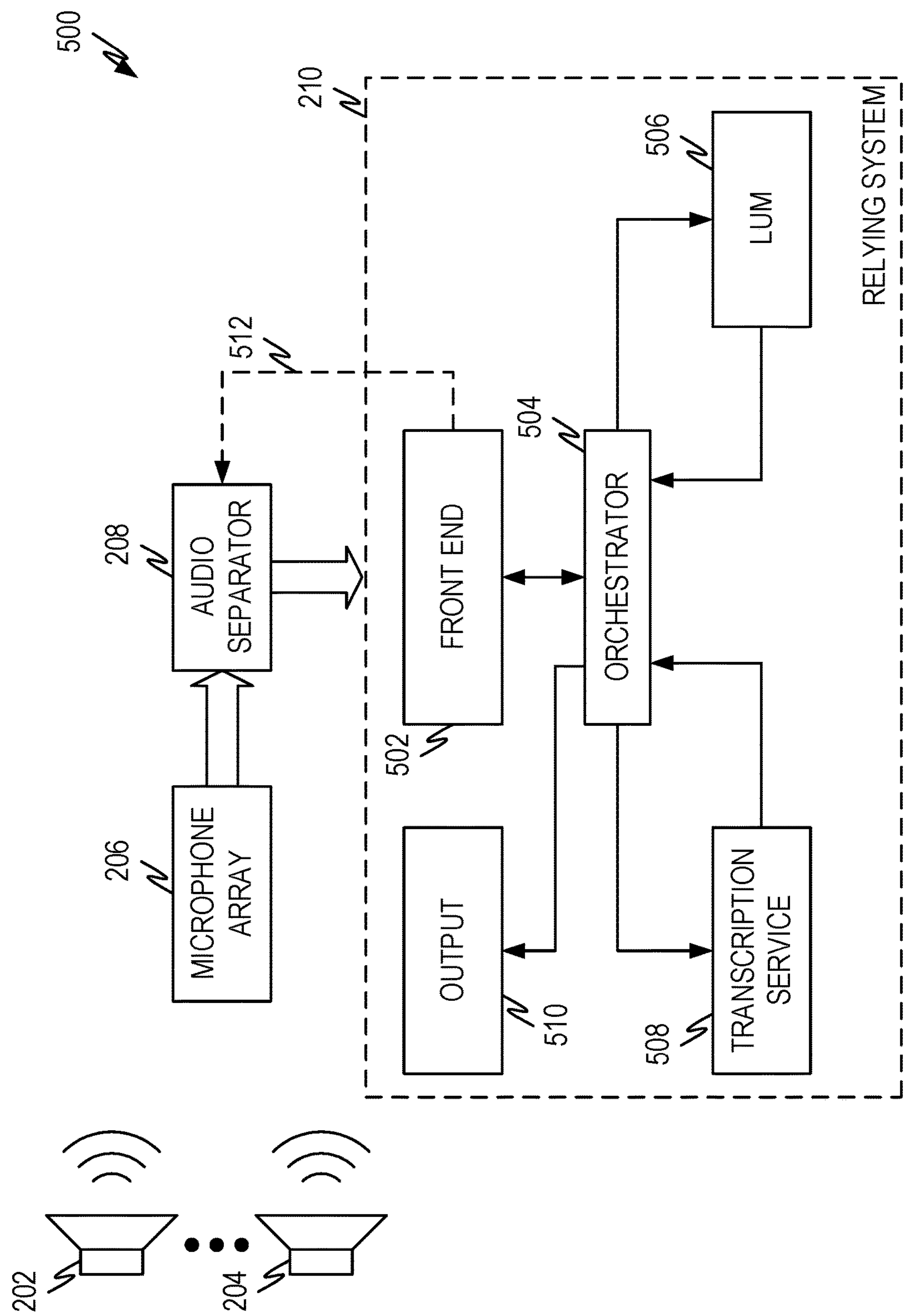
FIG. 5 illustrates a representative arrangement to utilize the audio separator of the present disclosure in conjunction with a transcription service according to some aspects of the present disclosure.

A representative example architecture to accomplish this is presented in FIG. 5. The architecture of FIG. 5 shares many similarities to prior architectures. This illustrates that such functionality may be accomplished, for example, using a digital assistant in some instances.

In the architecture of FIG. 5, the audio sources 202, 204 are separated out by the microphone array 206 and the audio separator 208 as previously described. The front end associates the separated audio output from the audio separator 208 with a speaker label for purposes of transcription. This can be accomplished by the correlation process and/or self-identification process as previously described. Association can be nothing more than identifying to the remainder of the system which audio is being sent for processing or it can be more complicated such as tagging the audio in a particular manner.

The front end can order (e.g., by time) audio if the remainder of the system is not set up to process multiple audio channels simultaneously. Thus, audio can be tagged so the system knows in what order to place the audio in the transcription and/or how to order sections of audio where multiple speakers are talking simultaneously. The front end can also do any audio buffering that needs to take place in some embodiments.

The audio is passed to the orchestrator 504 which orchestrates the remainder of the processes to ensure the transcription is produced. The orchestrator 504 passes the input audio to the language understanding model 506 which performs a speech to text conversion and otherwise prepares the audio for processing by the transcription service 508.

The orchestrator 504 passes converted speech to the transcription service 508 which performs any further processing to produce the transcription. Taking grammar cues from the language understanding model 506, time/ordering information, and/or speaker labels and creating the transcription, ensuring the transcription makes grammatical and logical sense. The transcription can be stored for later retrieval, displayed in real time, or both.

The orchestrator 504 passes any information to be output to the output process 510 where the output is sent to the appropriate place via the appropriate channel.

In still a further representative example, the audio sources 202, 204 can be musical instruments and/or mixed musical instrument and vocal and the output of the audio separator 208 can correspond to one or more of the instruments and/or vocals. The relying system 210 can then be a music information retrieval system that can use one or more of the musical instruments. For example, it may be easier to identify a song using only instruments and/or vocals that carry the melody line. Alternatively, the particular performance of the song may be identified by examining the base line, or other audio aspects. The output can be information identifying the song, performance, and so forth.

Figure 6:
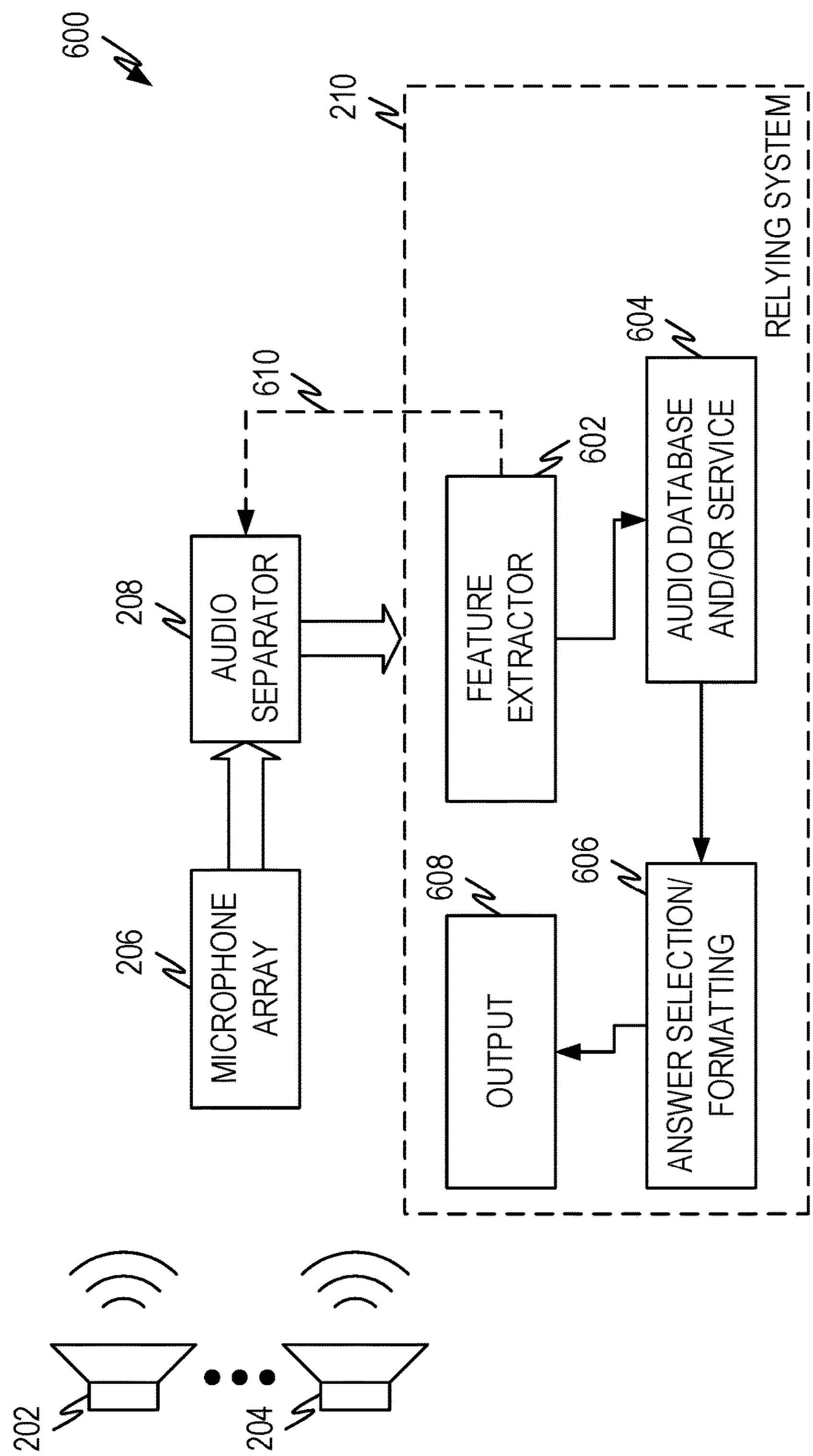
FIG. 6 illustrates a representative arrangement to utilize the audio separator of the present disclosure in conjunction with a music information service according to some aspects of the present disclosure.

A representative architecture for this is illustrated in FIG. 6. In this architecture the relying system 210 is a music information retrieval system/service. The separated audio is received by a feature extractor 602 that extracts information that will be used to retrieve the information desired. The feature extractor 602 can pass information back to the audio separator 208 and/or the microphone array 206 as indicated by dashed line 610 to help tune the separator 208 and/or the microphone array 206 to separate out the audio that is desired so that appropriate features can be extracted by the feature extractor 602.

Because multiple audio sources can be extracted, the feature extractor 602 can extract a combination of features that are used to retrieve the desired information. For example, the words of a song can be extracted (such as by the processes previously described in FIG. 4 and/or FIG. 5), the melody line of a particular instrument can be extracted, the bass line can be extracted, or any other feature or combination of features.

The extracted features are used to look up the desired information in an audio database and/or using an audio lookup service as indicated by 604. The returned information can be appropriately formatted by answer selection/formatting process 606. The output of this process can then be passed to the output process 608 which can perform any additional formatting, format conversion and so forth and select an appropriate channel to pass the information back to a user.

In still a further representative example, the audio sources 202, 204 can be musical instruments and/or mixed musical instrument and vocal and the output of the audio separator 208 can correspond to one or more of the instruments and/or vocals. The relying system can be a system that automatically creates a karaoke track that removes vocals and leaves the instruments intact (e.g., by subtracting the vocals from the soundtrack).

Figure 7:
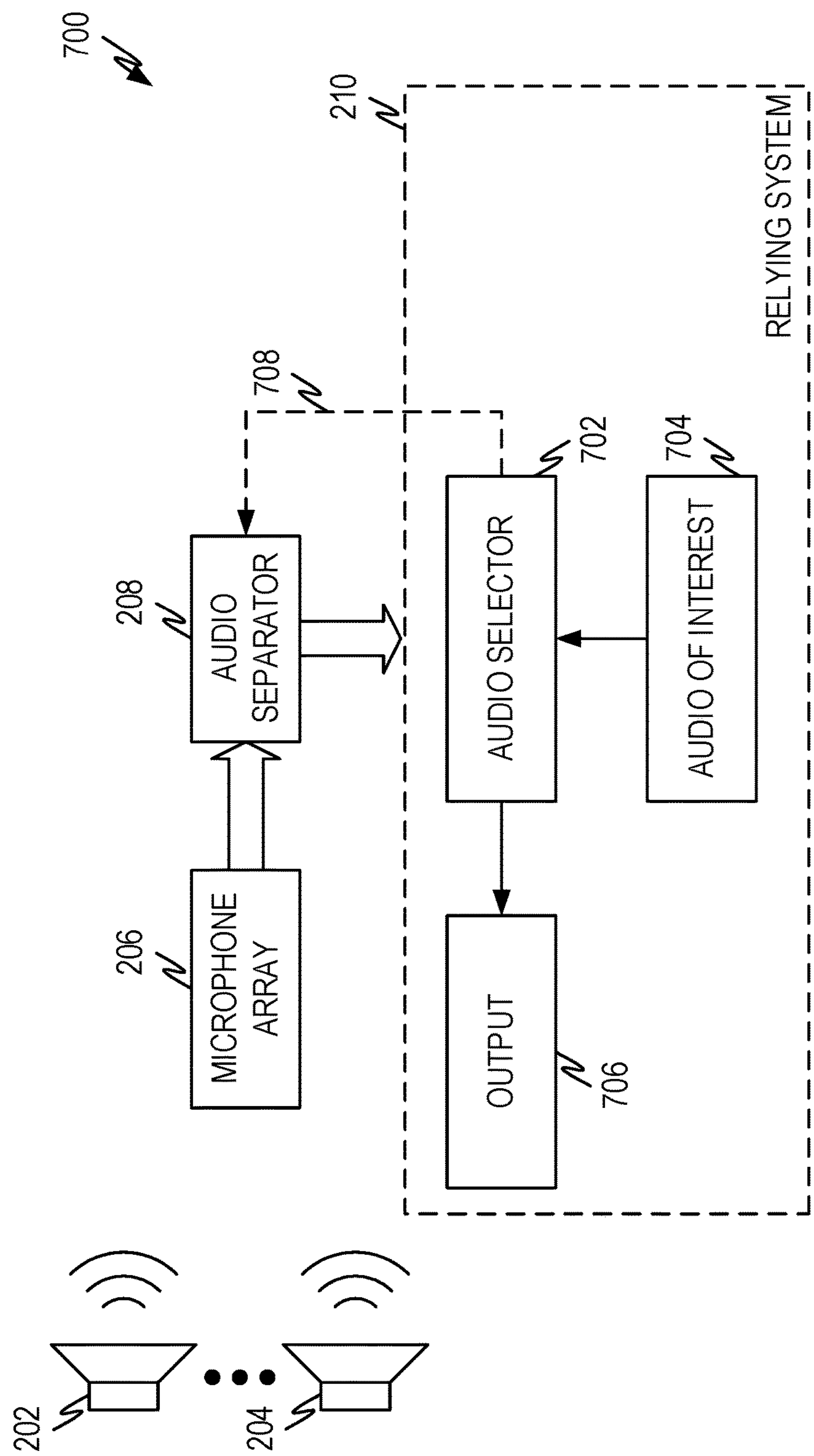
FIG. 7 illustrates a representative arrangement to utilize the audio separator of the present disclosure in conjunction to create a music track according to some aspects of the present disclosure.

A representative architecture is presented in FIG. 7. In this architecture the various audio sources (e.g., the musical track and the vocal track) can be separated out by the microphone array 206 and audio separator 208 as described herein. The audio of interest process 704 identifies what should be extracted, such as the music track, the vocal track and so forth. The audio selector 702 selects the appropriate track using the separated audio from the audio separator 208. If, for example, the audio separator 208 is trained to separate out vocal tracks and everything else, then the desired output can be obtained by subtracting the vocal track from everything else. Additionally, or alternatively, some of the separated outputs can be recombined to recreate a desired track/effect. This if particular instruments are separated out by the audio separator 208, and the vocals are filtered out during the separation process, then the audio track can be recreated by combining the separated-out instruments. Other implementations are also possible.

Many other relying systems 210 can be used with the audio separator 208.

Depending on the relying system 210, the system may send commands and/or information 212 back to the audio separator 208 and/or the microphone array 206. For example, if the audio output of a single human speaker is desired to be selected, the desired identity can be passed in the commands/information 212. Similarly, the commands/information 212 can represent any other desired audio source(s) that should be selected for consideration. The commands/information 212 can also be used to steer a null in a dynamic beamformer in a particular direction of dynamic beamforming is used.

Figure 8:
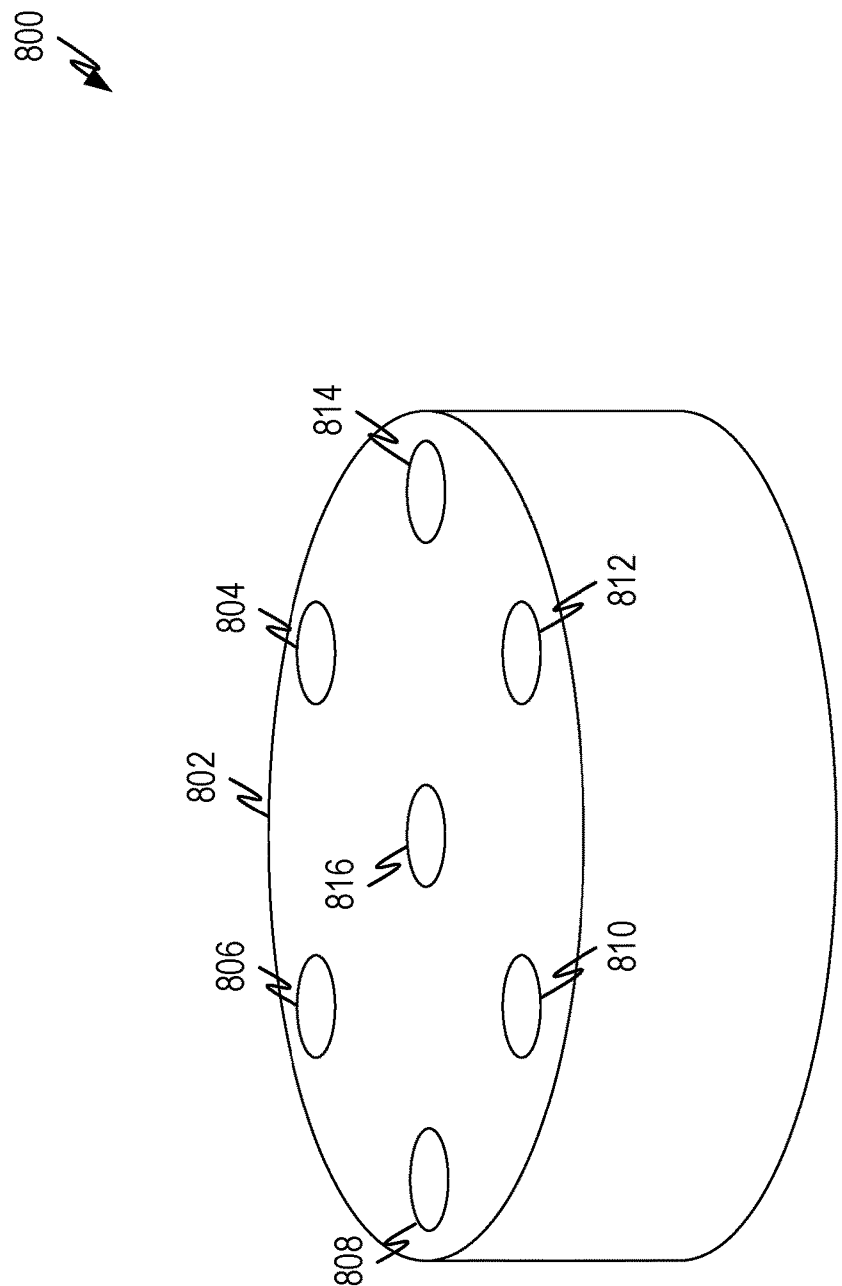
FIG. 8 illustrates a representation of a microphone array to recognize multiple audio sources according to some aspects of the present disclosure.

FIG. 8 illustrates a representation 800 of a microphone array 802 to recognize multiple audio sources according to some aspects of the present disclosure. In this disclosure a microphone array can be any arrangement of two or more microphones separated by a spatial distance. The number and placement of microphones in an array influences not only the number of beams that can be formed, but also the characteristics of the beams such as beamwidth, roll off characteristics of the beam, location, height, and width of sidelobes, and other such characteristics.

In this representative microphone array 802 six microphones 804, 806, 808, 810, 812, 814 are arranged in a circle. Each microphone is separated by 60 degrees. A single microphone 816 is placed in the center of the circle. With this arrangement, 12 beams can be formed, each targeted at a 30 degree offset from the prior beam (e.g., 0 degrees, 30 degrees, 60 degrees, and so forth). Thus, this arrangement produces 12 beams, one with a look direction of 0 degrees, one with a look direction of 30 degrees, and so forth. In one experimental setup the distance between the center microphone and the other microphones was 42.5 mm. Experimental results with this microphone array are presented below.

The microphone array in FIG. 8 is only a representative array and many other microphone arrangements are suitable for use in embodiments of the present disclosure. Principles for selecting an arrangement of microphones are known and depend on such aspects as the type of beamformer used, the number and look direction of beams to be formed, the mounting location of the array, the location (or likely location) of the audio sources, the characteristics (beam width of the main lobe of the acoustic beams, the roll off characteristics of the main lobe, side lobe characteristics such as number, height and location, and so forth) of the formed acoustic beams to be formed, and so forth.

Additionally, with the architecture proposed herein, there are various tradeoffs to selecting the number of beams used. The more beams that are used, the more likely it will be that one of them is targeted toward an audio source (speaker, instrument, and so forth). However, the greater the number of beams that are used, the more complicated the post selection task can be as discussed below.

Figure 9:
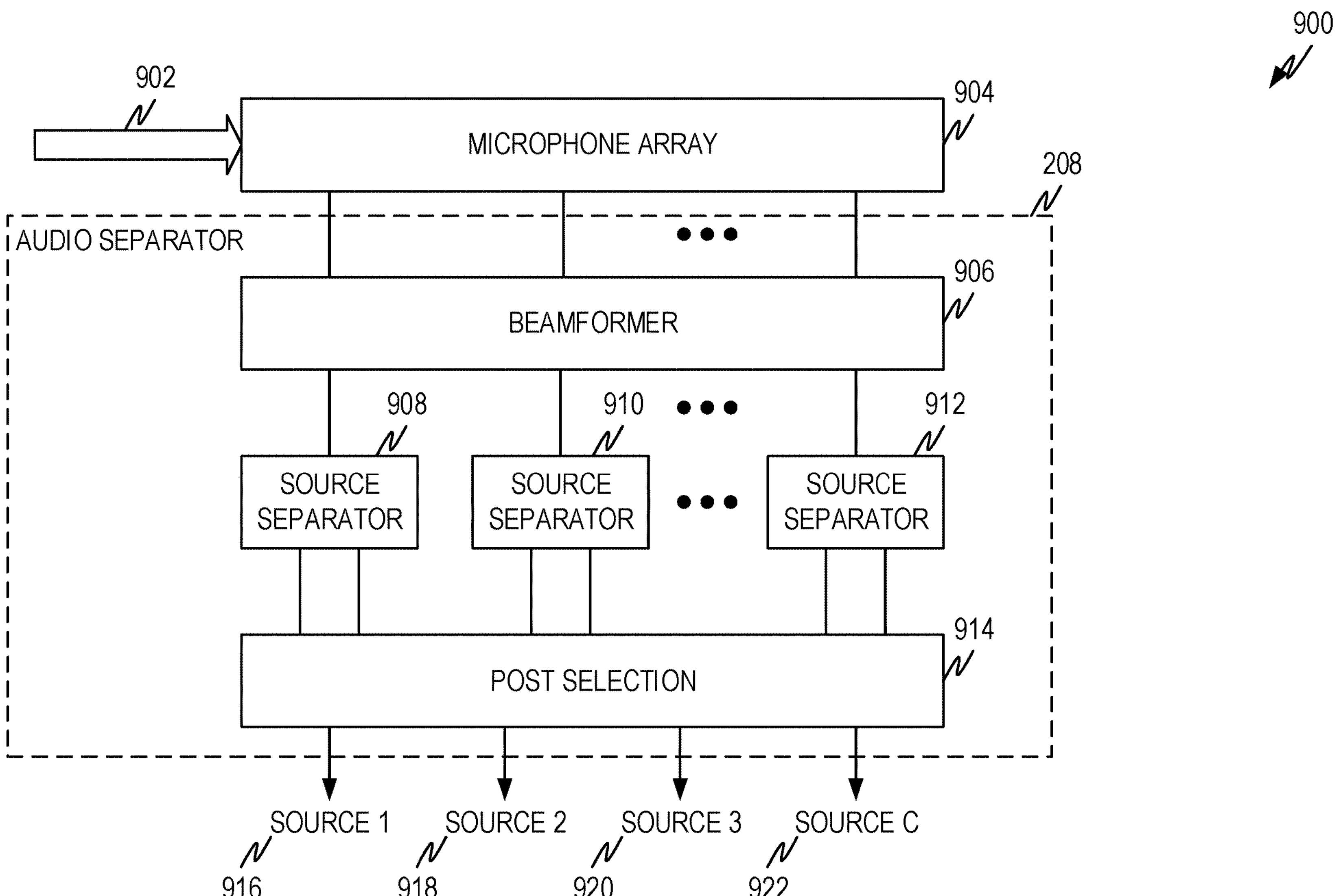
FIG. 9 illustrates example architecture for separating and recognizing multiple audio sources according to some aspects of the present disclosure.

FIG. 9 illustrates example architecture 900 for separating and recognizing multiple audio sources according to some aspects of the present disclosure. The architecture is designed to separate out C audio sources.

In the architecture sound 902 (comprising mixed audio from C audio sources) is received by a microphone array 904, such as the array of FIG. 8 or any other microphone array that produces a plurality of audio signals, one for each microphone.

The audio signals from the microphone array are fed into the audio separator 208 that separates out a desired number of audio sources. If C audio sources from the mixed audio input are desired, then the audio separator 208 separates out C sources as outputs 916, 918, 920, 922. In the architecture the microphone array 904 is shown as separate from the audio separator 208, but in some embodiments the microphone array 904 is part of the audio separator 208.

The audio separator 208 comprises a beamformer 906 to create directional beams from the output of the microphone array 904. The beamformer 906 produces B beams having desired characteristics and direction. Dynamic and/or fixed beamformers can be used with embodiments of the present disclosure. In one set of embodiments, fixed beamformers are used. Additive (e.g., delay-and-sum) or differential beamformers can be used. Differential beamformers can explicitly form acoustic nulls and can better suppress interfering audio sources when the audio sources are sufficiently spatially isolated from the target audio source. Thus, in one embodiment a fixed differential beamformer is used.

The microphone array 904 and beamformer 906 produce B spatially filtered audio channels, each channel corresponding to a directional beam formed using the beamformer 906 and microphone array 904. Each of the audio channels out of the beamformer 906 is fed into a source separator 908, 910, 912. The source separators 908, 910, 912 separate out sources, each produce E spectrally filtered outputs for the single input, using a trained machine learning model. Thus, the number of signals produced by the source separators are E×B. The source separators 908, 910, 912 are discussed in greater detail below.

The outputs of the source separators 908, 910, 912 are passed through a post selection process 914 to select C outputs 916, 918, 920, 922, one corresponding to each input source. The post selection process is discussed in greater detail below.

Figure 10:
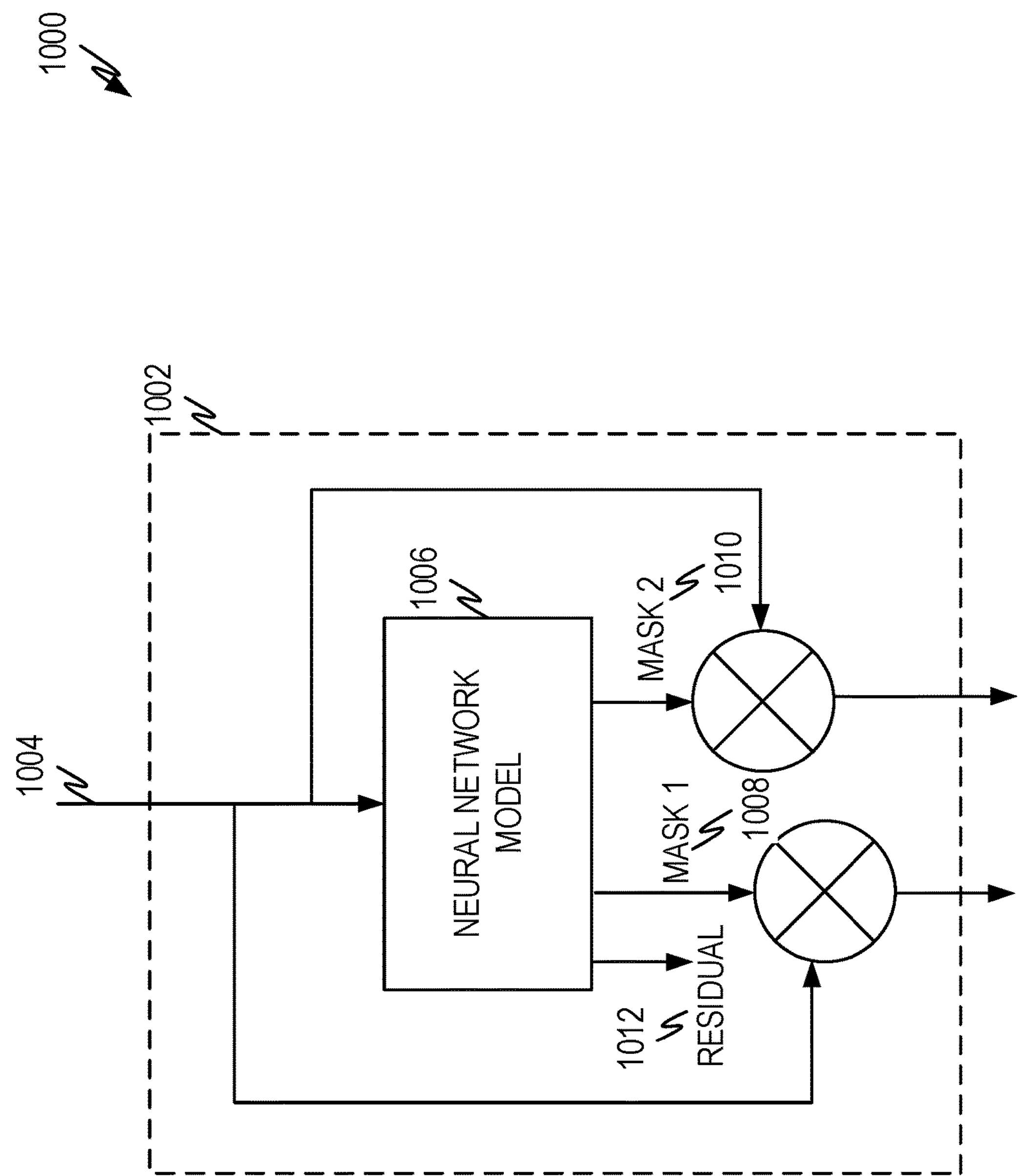
FIG. 10 illustrates a representative architecture for a single source separator according to some aspects of the present disclosure.

FIG. 10 illustrates a representative architecture 1000 for a single source separator 1002, such as the source separator 908, 910, 912 of FIG. 9 according to some aspects of the present disclosure. The purpose of the source separator 1002 is to separate out one or more audio sources in the channel.

The output of a beam from the beamformer (e.g., 906) is input into the source separator 1002. The source separator 1002 comprises a trained neural network model 1006 that produces one or more masks 1008, 1010 that separate out audio sources in the input signal 1004. The neural network model 1006 can also produce a residual 1012 where the remainder of the audio sources in the input signal 1004 are placed. The number of masks (plus the residual) are a set parameter in the trained neural network model 1006.

How many masks that are selected depends on the number of audio sources and the number of beams. In an ideal situation, each audio source would dominate a single beam. In that situation, only a single mask need be produced by the trained neural network model 1006 to select the dominate audio source in the beam. However, this is an unrealistic assumption to make when selecting the number of masks that should be produced by the trained neural network model 1006. When audio sources are close to teach other spatially, or when there are audio sources that are quieter than others, it is likely that certain audio sources will not dominate any of the beams. For example, in an experimental data set (discussed below) more than 70% of the 4-speaker mixtures have such weaker speakers.

In a representative embodiment, if C is the number of audio sources, the number of audio sources, E, in a beam falls between 1 and C: $1 \leq E \leq C$. Selection of the number of audio sources is discussed below.

Thus, although the trained neural network model 1006 is shown to produce two masks and a residual, embodiments of the present disclosure can produce either more or fewer masks.

A number of different trained neural network models 1006 can be utilized in embodiments of the present disclosure. Representative neural network models 1006 that are suitable include, but are not limited to, Deep Attractor Network (DAN), Deep Clustering (DCPL), Permutation Invariant Training (PIT), and Anchored Deep Attractor Network (ADAN). A discussion of an ADAN model is presented in conjunction with FIG. 6 below. Based on that discussion, those of skill in the art should understand how to apply other trained neural network models such as DAN, DCPL, PIT, and so forth.

Figure 11:
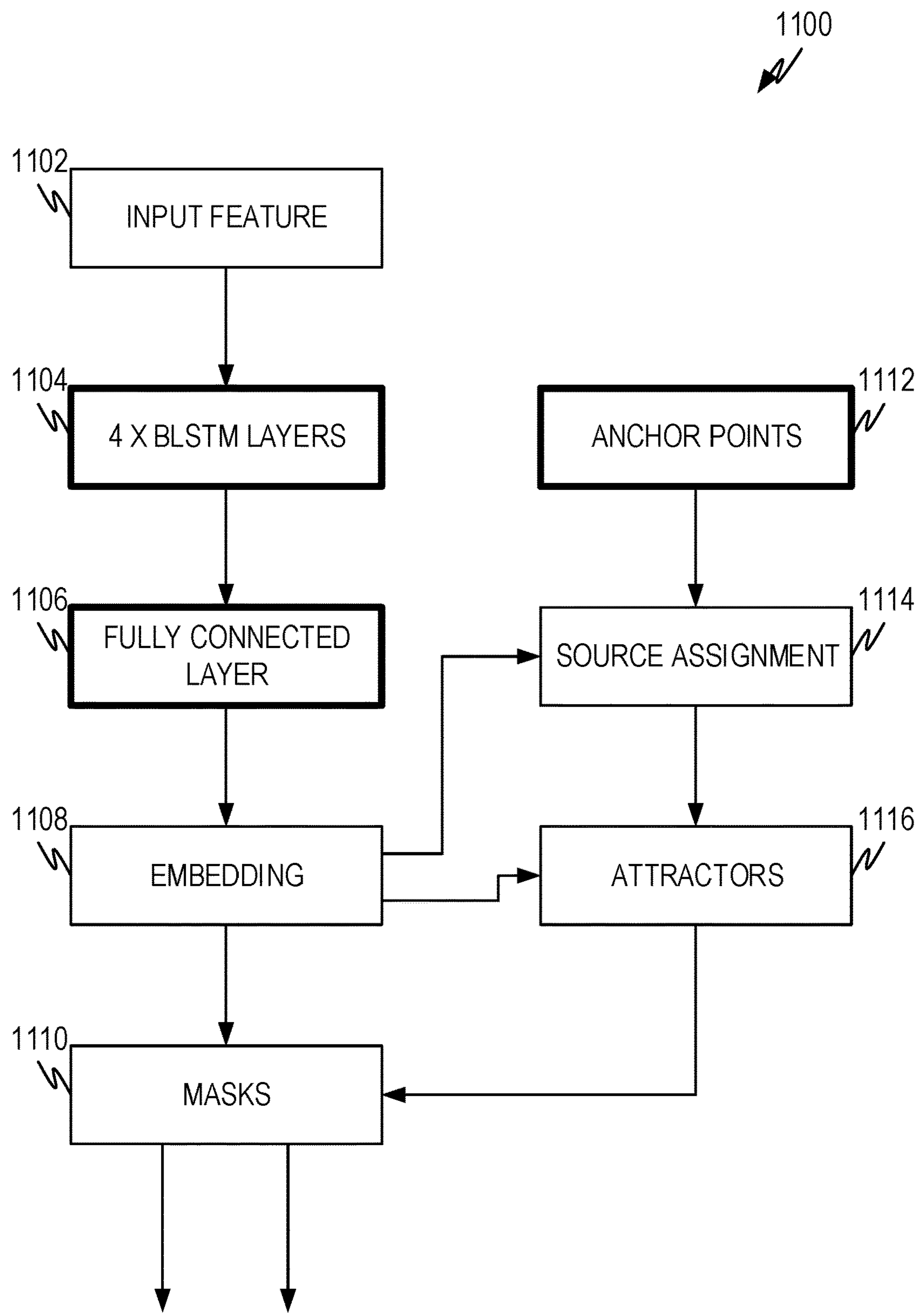
FIG. 11 illustrates an architecture for an example neural network model according to some aspects of the present disclosure.

FIG. 11 illustrates an architecture 1100 for an example neural network model according to some aspects of the present disclosure. The architecture 1100 illustrates an ADAN. In the architecture the heavy bordered operations (1104, 1106, 1112) are trainable parameters.

The architecture takes an input signal 1102, which comes from a beam (e.g., input 1004) and projects the signal using a trained neural network onto a high-dimensional embedding space where the projected time-frequency bins of each source are pulled toward several attractor points in the embedding space. During the training phase, the attractors are formed using true or estimated source assignments.

In operation, an embedding matrix, $V \in \mathbb{R}^{T \times F, K}$, (1108) is created by the neural network (1104, 1106) by projecting the time-frequency bins to a high dimensional embedding space as given by:

$$V_{t,f,k} = \Phi(X_{t,f})$$

Where: T, F, K denotes time, frequency and embedding axis; and $\Phi(\bullet)$ refers to the neural network transformation Once the embedding matrix is derived by the neural network as illustrated by 1108, a pre-segmentation is applied by calculating the distance of the embedding with several pre-trained points in the embedding space referred to as anchor points 1112. More specifically, where there are C mixing sources (audio sources), there are N anchors denoted as: $H \in \mathbb{R}^{N \times K}$. Each source is targeted to bind with one anchor. Then there are $$P = \binom{N}{C}$$

total number of source-anchor combinations.

For each combination in P, the system calculates a soft pre-segmentation $W_{p,c,t,f}$ by normalizing the distance between each embedding point to each of the anchors. This is given by:

$$W_{p,c,tf} = softmax\left(\sum_k H_{p,c,k} \times V_{tf,k}\right)$$

Where softmax(•) is the softmax activation function over the c axis. This is illustrated by source assignment 1114.

Based on the soft pre-segmentation, $W_{p,c,t,f}$, for each combination P, the attractor $A_{p,c,k}$ is then calculated as the weighted average of embedding points:

$$A_{p,c,k} = \frac{\sum_{tf} V_{k,tf} \times W_{p,c,tf}}{\sum_{tf} W_{p,c,tf}}$$

This yields P sets of attractors, one of which is used for further processing. The in-set similarity is defined for each attractor set. The in-set similarity is defined by:

$$S_p = \text{Max}\left\{\sum_k A_{p,i,k} \times A_{p,j,k}\right\} \text{ for } 1 \le i \le j \le C$$

Because the attractors serve as the center for each source to be separated, the system selects the attractor set with the minimum in-set similarity:

$$\hat{A} = \arg\min\{S_p\} \text{ for } 1 \le p \le P$$

The selected attractor set, $\hat{A}$, is illustrated by 1116.

Once the set of attractors have been selected, a mask is formed for each source based on the picked attractor. The masks are given by the equation:

$$M_{f,t,c} = softmax\left(\sum_k A_{c,k} \times V_{tf,k}\right)$$

Masked audio signals, $X_{f,t} \times M_{f,t,c}$, is compared to the clean references, $S_{f,t,c}$, under a squared error measurement as given in:

$$\mathcal{L} = \sum_{f,t,c} \|S_{f,t,c} - X_{f,t} \times M_{f,t,c}\|^2$$

This is illustrated by 1110.

Unlike DAN, the oracle binary mask is not used during training, therefore the source information is not available at the training stage, leading to the so called permutation problem. Thus, embodiments of the present disclosure can use PIT to fix this problem, where the best permutations of the C sources are exhaustively searched. This is done by computing the squared error for each permutation of the masked speech outputs and selecting the minimum error as the error to generate the gradient for back propagation.

As noted above, in a representative embodiment, if C is the number of audio sources, the number of audio sources, E, in a beam falls between 1 and C: 1≤E≤C. In embodiments of the present disclosure, the number of masks, G, selected for the neural network model of the source selector is often greater than one. More specifically, for each beam G=E+1 are firstly generated from the embedding, among which E sources are selected to compare to the clean references. The process is repeated for all $$\binom{G}{E}$$

possibilities. The permutation selected is that permutation that leads to the minimum squared error and that error is used as the final error for back propagation.

In some embodiments of the present disclosure where the number of sources C is greater than 2, G is selected as three and E is selected as two.

Figure 12:
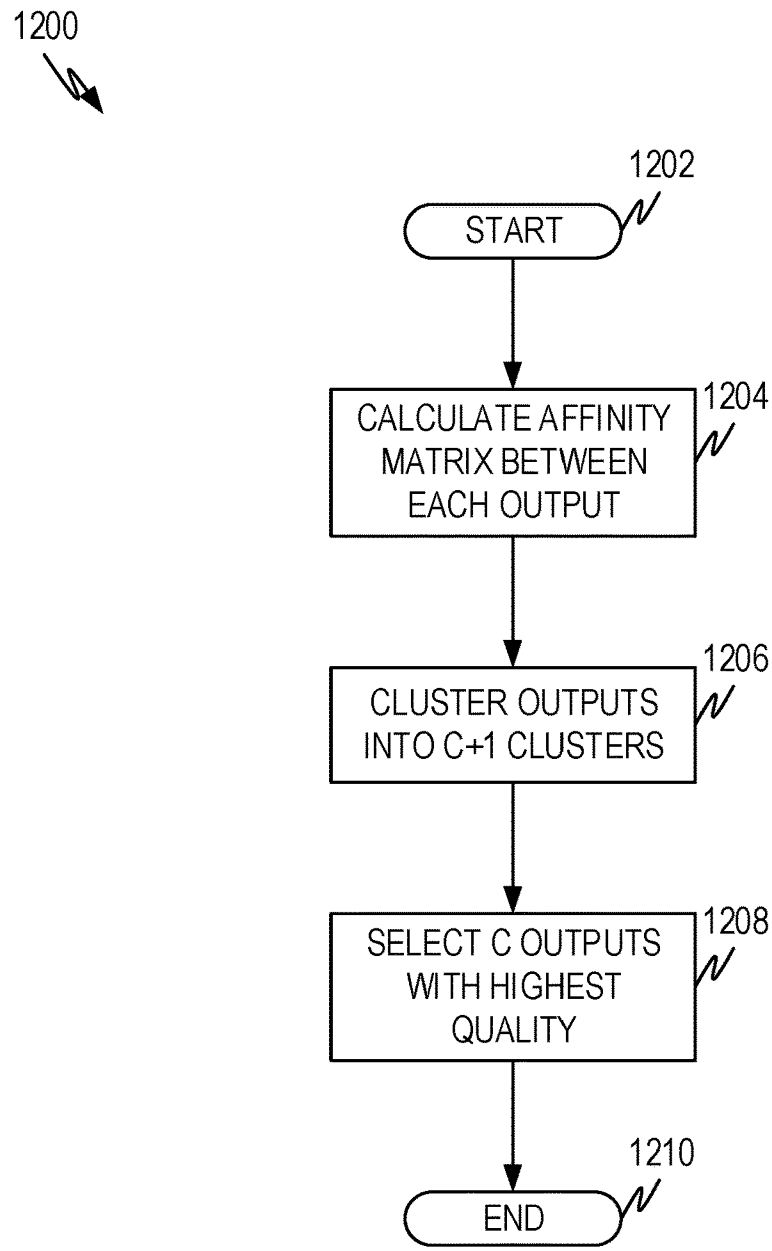
FIG. 12 illustrates a representative flow diagram for post selection processing according to some aspects of the current disclosure.

FIG. 12 illustrates a representative flow diagram 1200 for post selection processing according to some aspects of the current disclosure. After the single channel processing (e.g., the source separators), E outputs will be generated for each of the B beams, resulting in a total of E×B outputs. The task of the post selection processing is to select C of the E×B outputs, one to represent each of the C sources as a final output.

The outputs of the source separators will have some degree of separation between the input sources, which can simplify the output selection. Additionally, assumptions can further simplify the output selection. For example, the assumption that the strongest speaker in one beam will be likely to dominate neighboring beams. For example, in an experimental data set (discussed below) more than 70% of the 4-speaker mixtures have such weaker (or soft) speakers that do not dominate any particular beam when overlapping audio is present. Moreover, actual speaker locations may be detected from segments of non-overlapping audio, which could help determine which signals to output. In addition, the outputs can be run through speech recognition or other algorithms to identify which sources have the "best" quality.

The architecture in FIG. 12 does not incorporate any of these assumptions, but relies on spectral clustering to identify which outputs should be selected. The method begins in operation 1202 and proceeds to operation 1204 which calculates an affinity matrix between each of the E×B magnitude spectrograph by their Pearson correlation.

Operation 1206 uses spectral clustering to group the columns of the affinity matrix into C+1 clusters. The motivation for using an additional cluster is reduce the impact of failure separation in certain beams and artifacts by isolating them in the additional cluster. In experiments performed for this operation, 92.5%, 96%, and 99.5% of 4-speaker, 3-speaker and 2-speaker mixtures of a test data set were correctly segregated into different clusters.

After the spectral clustering, operation selects the output in each cluster that has best audio quality. How the "best" audio quality is measured can depend on the type of audio being separated. For example, for speech the outputs of each cluster can be fed into a speech recognition algorithm and the output with the highest recognition value in each cluster selected as the output for that source. Alternatively, a mean to standard variation criterion can be used. Thus, the output with the highest mean to standard deviation of the signal can be selected. As yet another alternative, if the spectral characteristics of the source are known, the signals with the closest spectral characteristics can be selected. For example, if the system is trying to select between different instruments that have different spectral characteristics, the spectral characteristics of each cluster can be compared to a representative spectrum for each instrument and those that match the closest can be selected. Other alternatives can also be used.

The architecture described herein was tested against a new speech mixture corpus created using utterances taken from the Wall Street Journal (WSJ0) corpus. Three mixing conditions were considered: 2-speaker, 3-speaker, and 4-speaker mixtures. For each condition, a 10-hour training set, a 1-hour validation set, and a 1-hour testing set were created. Both training and validation sets were sampled from the WSJ0 training set si_tr_s. Thus, the validation set is called the closed set. Note, however, that there was no utterance appearing in both the training and validation data. The testing data (or the open set) were generated similarly by using utterances of 16 speakers from the WSJ0 development set si_dt_05 and the evaluation set si_et_05. The testing set had no speaker overlap with the training and validation sets. In each mixture, the first speaker was used as reference, and a mixing SNR was randomly determined for each remaining speaker in the range from −2.5 dB to 2.5 dB. For each mixture, the source signals were truncated to the length of the shortest one to ensure that the mixtures were fully overlapped.

Each multi-channel mixture signal was generated as follows. Firstly, single-channel clean sources were sampled from the original corpus. Then a room with a random size was selected, where a length and a width were sampled from [1 m, 10 m], a height was sampled from [2.5 m, 4 m]. An absorption coefficient was also randomly selected from the range of [0.2 0.5]. Positions for a microphone array and each speaker were also randomly determined. For each mixture, we ensured only up to 2 speaker to present within 30 degrees. Then, a multi-channel room impulse response (RIR) was generated with the image method, which was convolved with the clean sources to generate reverberated source signals. They were mixed randomly chosen SNRs to produce the final mixture signal to use.

For speech recognition experiments, another testing set was created by using utterances from WSJ si_et_05. The utterances without pronounced punctuation were used. Unlike the testing data for speech separation experiments, the source signals were aligned to the longest one by zero padding. This is because signal truncation can be harmful to speech recognition. All data were down sampled to 8K Hz. The log spectral magnitude was used as the input feature for a single-channel source separation (i.e., ADAN) network, which was computed by using short-time Fourier transform (STFT) with a 32 ms. Hann window shifted by 8 ms.

The network used in the experiments consisted of 4 bi-directional long short term memory (BLSTM) layers, each with 300 forward and 300 backward cells. A linear layer with Tanh activation function was added on top of the BLSTM layers to generate embeddings for individual T-F bins. In the network, six anchor points were used, and the embedding space had 20 dimensions. The network was initialized with a single-channel trained 3 speaker separation network and then fine tuned on beamformed signals. To reduce the training process complexity, for each speaker in each mixture, only the beam where the speaker had the largest SNR was used for training.

For the Automatic Speech Recognition (ASR) experiment, we first trained a clean acoustic model which is a 4-layer LSTM-RNN (long short term memory-recurrent neural network) with 5976 senones and trained to minimize a frame-level cross-entropy criterion. LSTM-RNNs have been shown to be superior than the feed-forward DNNs (deep neural networks). Each LSTM layer has 1024 hidden units and the output size of each LSTM layer is reduced to 512 using a linear projection layer. There is no frame stacking, and the output HMM (hidden Markov model) state label is delayed by 5 frames, with both the singular value decomposition and frame skipping strategies to reduce the runtime cost. The input feature is the 22-dimension log-filter-bank feature extracted from the 8k sampled speech waveform. The transcribed data used to train this acoustic model comes from 3400 hours of US-English audio gathered from a digital assistant.

A far-talk ASR model with a domain adaptation method based on teacher-student (T/S) learning was also built. T/S learning method is very effective in producing accurate target-domain model. The far-talk data is simulated from the 3400 hours clean data by using the room impulse response collected from public and Microsoft® internal databases. The clean data is processed by the clean model (teacher) to generate the corresponding posterior probabilities or soft labels. These posterior probabilities are used in lieu of the usual hard labels derived from the transcriptions to train the target far-talk (student) model with the simulated far-talk data.

Signal-to-distortion ratio (SDR), calculated by the bss_eval tool box, was used to measure the output speech quality. Results report average SDR improvement as well as SDR improvement for top speakers, i.e. the speakers who have larger mixing SNRs. The ASR performance was evaluated in terms of word error rate (WER).

To better evaluate the proposed system, six baseline systems were included in our evaluation. We firstly include three oracle beamforming systems: the multi-beam beamformer (MBBF), the oracle generalized eigenvalue (OGEV) beamformer and the oracle minimum variance distortionless response (OMVDR) beamformer. The implementation of Jahn Heymann, Lukas Drude, and Reinhold Haeb-Umbach, "Neural network based spectral mask estimation for acoustic beamforming," in Acoustics, Speech and Signal Processing (ICASSP), 2016 IEEE International Conference on. IEEE, 2016, pp. 196-200 (incorporated herein by reference) was used for OGEV and that of Xiong Xiao, Shengkui Zhao, Douglas L Jones, Eng Siong Chng, and Haizhou Li, "On time-frequency mask estimation for mvdr beamforming with application in robust speech recognition," in Acoustics, Speech and Signal Processing (ICASSP), 2017 IEEE International Conference in IEEE, 2017, pp. 3246-3250 (incorporated herein by reference) was used for OMVDR. In OGEV, for each speaker, oracle target and noise covariance matrices were calculated from the clean target and the mixture of the rest speakers. In OMVDR, for each speaker, a steering vector was calculated with the known speaker and microphone locations, and oracle noise covariance matrices were calculated from the mixture of the rest speakers. Thus, the OMVDR has exact position information while in OGEV the steering vector is calculated from the oracle clean covariance metric, which as seen in the test results where OGEV didn't perform as well as OMVDR.

The oracle MVDR that used only target speaker directions was also compared to the other systems. This system represents a more practical system since exact locations are not known. However, the performance was significantly worse than all other systems, and therefore its result is not reported.

In MBBF, the oracle beam selection strategy was adopted. That is, for each speaker, we picked the beam that had largest SDR for that speaker. It should be note that after the MBBF step, most of the beams are still highly mixed because the spatial separation capability of fixed beamformers is limited. Therefore, the post selection method of FIG. 7 did not work. We also included the single and multi-channel ideal-ratio-mask (IRM) system for comparison, where a mixture spectrogram was masked by oracle IRMs for each target speaker, and converted to a time domain signal with noisy phase information. As regards the multi-channel IRM (MBIRM), the multi-channel mixture signal was first processed by the differential beamformer. Then, for each speaker, the IRM approach was applied to the beamformed signal that had the largest SDR for that speaker.

The results are reported in Tables 1 and 2. Tables 1 and 2 reports the SDR (dB) improvement for 2, 3 and 4 speaker mixtures in the closed and open speaker set. In Tables 1 and 2 the MBDAN refers to the architecture disclosed herein with the clustering-based post selection (e.g., described in FIG. 12). The OMBDAN refers to the proposed system with oracle selection, where C outputs that have the best performances in reference to each clean signal are selected.

TABLE 1

SDR (dB) improvement for 2, 3 and 4 speaker mixture

| | MBBF | MBDAN | OMBDAN | MBIRM |
|---|---|---|---|---|
| Closed Set | | | | |
| 2 speakers | +7.28 | +8.95 | +11.02 | +15.04 |
| 3 speakers | +6.86 | +10.20 | +11.76 | +14.8 |
| 4 speakers | +6.24 | +9.57 | +11.55 | +13.05 |
| Open set | | | | |
| 2 speakers | +7.13 | +8.84 | +10.98 | +12.05 |
| 3 speakers | +7.12 | +9.94 | +11.54 | +15.9 |
| 4 speakers | +6.37 | +9.53 | +11.19 | +12.75 |

TABLE 2

SDR (dB) improvement for 2, 3 and 4 speaker mixture

| | OGEV | OMVDR | IRM | DAN |
|---|---|---|---|---|
| Closed Set | | | | |
| 2 speakers | +1.82 | +11.99 | +10.91 | +7.32 |
| 3 speakers | +4.64 | +12.4 | +11.74 | +5.11 |
| 4 speakers | +6.23 | +11.73 | +12.17 | +4.21 |
| Open set | | | | |
| 2 speakers | +2.17 | +12.00 | +11.05 | +7.82 |
| 3 speakers | +4.96 | +12.56 | +11.52 | +5.16 |
| 4 speakers | +6.24 | +11.82 | +12.22 | +4.23 |

Except for the single channel DAN and MBDAN all other baseline systems in Tables 1 and 2 use some form of oracle information and thus represent some form of maximum performance and are not representative of how an actual system would perform (e.g., because the oracle information is unknowable in an actual system). As seen when comparing the DAN to the MBDAN system, the MBDAN system proposed in the present disclosure outperforms the single channel DAN in all areas.

Example Machine Architecture and Machine-Readable Medium

Figure 13:
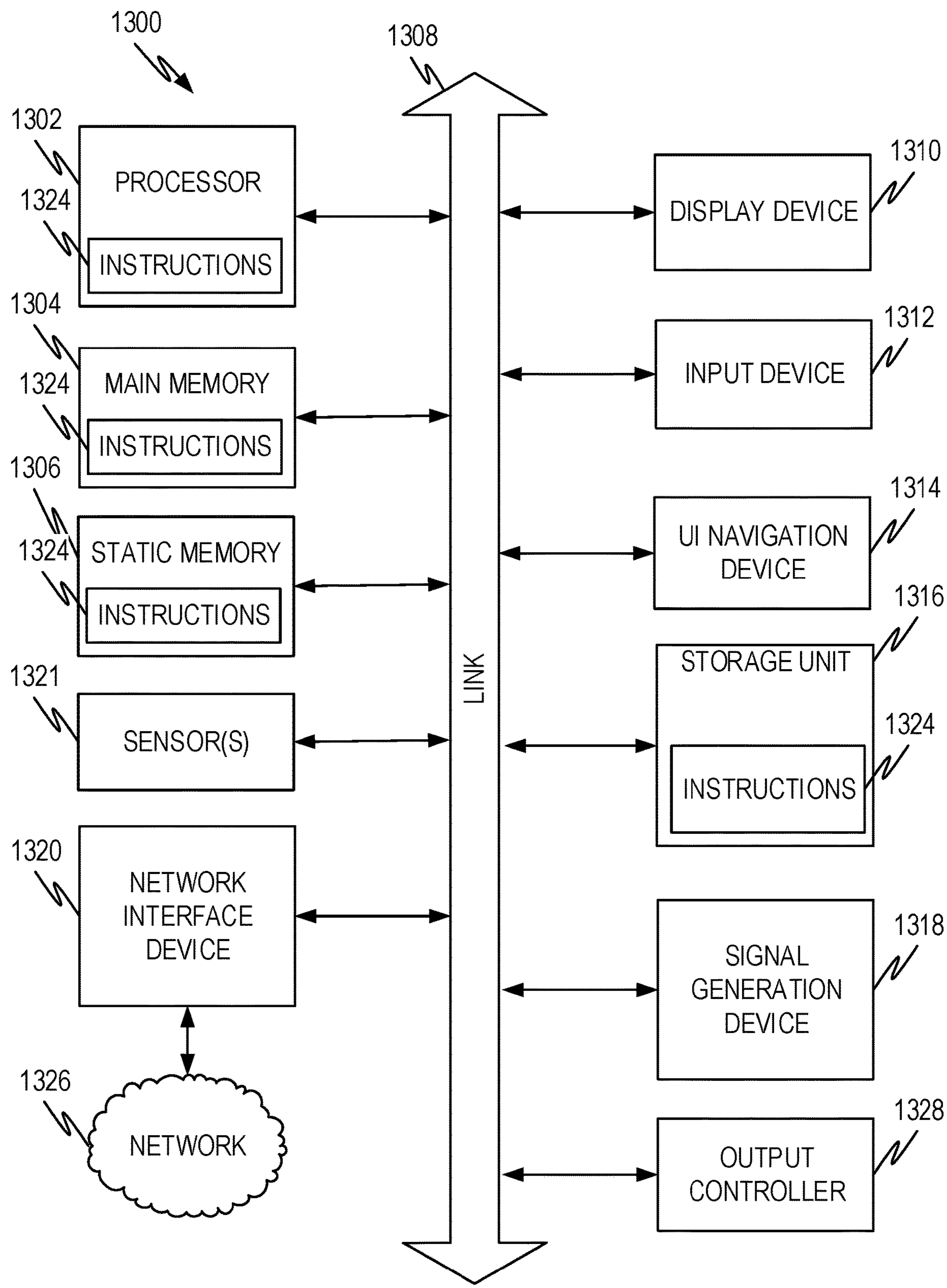
FIG. 13 illustrates a representative machine architecture suitable for implementing the systems and other aspects disclosed herein or for executing the methods disclosed herein.

FIG. 13 illustrates a representative machine architecture suitable for implementing the systems and other aspects disclosed herein or for executing the methods disclosed herein. The machine of FIG. 13 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 13 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1300 includes at least one processor 1302 (e.g., a central processing unit (CPU), a graphics processing unit (GPU), advanced processing unit (APU), or combinations thereof), one or more memories such as a main memory 1304, a static memory 1306, or other types of memory, which communicate with each other via link 1308. Link 1308 may be a bus or other type of connection channel. The machine 1300 may include further optional aspects such as a graphics display unit 1310 comprising any type of display. The machine 1300 may also include other optional aspects such as an alphanumeric input device 1312 (e.g., a keyboard, touch screen, and so forth), a user interface (UI) navigation device 1314 (e.g., a mouse, trackball, touch device, and so forth), a storage unit 1316 (e.g., disk drive or other storage device(s)), a signal generation device 1318 (e.g., a speaker), sensor(s) 1321 (e.g., global positioning sensor, accelerometer(s), microphone(s), camera(s), an eye tracking subsystem, and so forth), output controller 1328 (e.g., wired or wireless connection to connect and/or communicate with one or more other devices such as a universal serial bus (USB), near field communication (NFC), infrared (IR), serial/parallel bus, etc.), and a network interface device 1320 (e.g., wired and/or wireless) to connect to and/or communicate over one or more networks 1326.

Rather than the more conventional microprocessor, Neural Network chips can be used to implement embodiments of the present disclosure. Neural Network chips are specialized chips designed to execute various forms of neural networks. As such, they are suitable for use in implementing aspects of the present disclosure such as the source separators 910 and other neural network aspects of the present disclosure. Based on the disclosure contained herein, those of skill in the art will know how to implement the embodiments of the present disclosure using one or more neural network chips.

Additionally, beamformers (e.g., beamformer 906) and microphone arrays (e.g., microphone array 904) are often implemented in whole or in part using discrete circuitry or specialized circuitry tailored to the design. This is particularly true where fixed beamformers such as those discussed that form beams at 30 degree offsets from each other are utilized with an appropriate array microphone. These are all suitable for implementation of embodiments of the present disclosure and those of skill in the art will understand how to implement embodiments of the present disclosure based on the disclosure contained herein.

Executable Instructions and Machine-Storage Medium

The various memories (i.e., 1304, 1306, and/or memory of the processor(s) 1302) and/or storage unit 1316 may store one or more sets of instructions and data structures (e.g., software) 1324 embodying or utilized by any one or more of the methodologies or functions described herein. These instructions, when executed by processor(s) 1302 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method, comprising:

receiving audio input from a plurality of microphones;

creating a plurality of beamformed signals from the received audio input using a beamformer coupled to the plurality of microphones, each beamformed signal corresponds to a different directional beam; and creating a plurality of spectrally filtered outputs from the plurality of beamformed signals using a separator comprising a trained neural network coupled to each output of the beamformer, each separator producing E spectrally filtered outputs from a single beamformed signal.

Example 2

The method of example 1 further comprising:

selecting a subset of the plurality of spectrally filtered outputs based on a quality metric.

Example 3

The method of example 2 wherein a number of outputs that comprise the subset equals a number of audio sources.

Example 4

The method of example 2 wherein selecting the subset comprises:

calculating an affinity matrix between a magnitude spectrogram corresponding to each spectrally filtered output of the separators by their Pearson correlation;

grouping columns of the affinity matrix into C+1 clusters using spectral clustering; and selecting C outputs from the clusters having a highest speech quality metric.

Example 5

The method of example 4 wherein the speech quality metric is computed using a mean to standard deviation criteria.

Example 6

The method of example 1 wherein E equals 2.

Example 7

The method of example 1 wherein the plurality of beamformed signals are created using differential beamforming.

Example 8

The method of example 1, 2, 3 4, 5, 6 or 7, wherein the neural network is an Anchored Deep Attractor Network.

Example 9

The method of example 1, 2, 3 4, 5, 6 or 7, wherein the neural network comprises:

a Deep Attractor network;

a Deep Clustering network; or a Permutation Invariant Training network.

Example 10

A system comprising:

a microphone array comprising a plurality of microphones arranged at spatially different locations;

a beamformer coupled to the microphone array, the beamformer receiving a plurality of audio signals from microphone array and producing a plurality spatially filtered audio channels, each channel corresponding to a different directional beam; and a separator comprising a trained neural network coupled to each spatially filtered audio channel of the beamformer, each separator producing E spectrally filtered outputs corresponding to E audio sources separated for that separator.

Example 11

The system of example 10 wherein the beamformer is a differential beamformer.

Example 12

The system of example 10 wherein the beamformer is a fixed beamformer unit.

Example 13

The system of example 10 further wherein the neural network comprises:

an Anchored Deep Attractor Network;

a Deep Attractor network;

a Deep Clustering network; or a Permutation Invariant Training network.

Example 14

The system of example 10 further comprising:

a post selection processor to select C audio sources from the plurality of audio sources produced by the combined separators based on a speech quality metric.

Example 15

The system of example 14 wherein the post selection processor comprises acts of:

calculating an affinity matrix between a magnitude spectrogram corresponding to each output signal of the separators by their Pearson correlation;

grouping columns of the affinity matrix into C+1 clusters using spectral clustering; and selecting C outputs from the clusters having a highest speech quality metric.

Example 16

A computer implemented method, comprising:

receiving audio input from a plurality of microphones;

creating a plurality of beamformed signals from the received audio input using a beamformer coupled to the plurality of microphones, each beamformed signal corresponds to a different directional beam; and creating a plurality of spectrally filtered outputs from the plurality of beamformed signals using a separator comprising a trained neural network coupled to each output of the beamformer, each separator producing E spectrally filtered outputs from a single beamformed signal.

Example 17

The method of example 16 further comprising:

selecting a subset of the plurality of spectrally filtered outputs based on a quality metric.

Example 18

The method of example 17 wherein a number of outputs that comprise the subset equals a number of audio sources received via the plurality of microphones.

Example 19

The method of example 17 wherein selecting the subset comprises:

calculating an affinity matrix between a magnitude spectrogram corresponding to each spectrally filtered output of the separators by their Pearson correlation;

grouping columns of the affinity matrix into C+1 clusters using spectral clustering; and selecting C outputs from the clusters having a highest speech quality metric.

Example 20

The method of example 19 wherein the speech quality metric is computed using a mean to standard deviation criteria.

Example 21

The method of example 16, 17, 18, 19, or 20 wherein E equals 2.

Example 22

The method of example 16, 17, 18, 19, 20, or 21 wherein the trained neural network is trained using an audio sample for an audio source producing the audio input from the plurality of microphones.

Example 23

The method of example 16, 17, 18, 19, 20, 21 or 22 wherein the neural network is an Anchored Deep Attractor Network.

Example 24

The method of example 16, 17, 18, 19, 20, 21 or 22 wherein the neural network comprises:

a Deep Attractor network;

a Deep Clustering network; or a Permutation Invariant Training network.

Example 25

The method of example 16, 17, 18, 19, 20, 21, 22, 23 or 24 wherein the plurality of microphones are arranged at spatially different locations to form a microphone array.

Example 26

The method of example 16, 17, 18, 19, 20, 21, 22, 23, 24, or 25 wherein the beamformer is a differential beamformer.

Example 27

The method of example 16, 17, 18, 19, 20, 21, 22, 23, 24, 25, or 26 wherein the beamformer is a fixed beamformer unit.

Example 28

The method of example 16, 17, 18, 19, 20, 21, 22, 23, 24, 25, or 26 wherein the beamformer is a dynamic beamformer.

Example 29

An apparatus comprising means to perform a method as in any preceding example.

Example 30

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer implemented method, comprising:

receiving audio input from a plurality of microphones;

creating a plurality of beamformed signals from the received audio input using a beamformer coupled to the plurality of microphones, each beamformed signal corresponding to a different directional beam;

coupling a separator to the output of each beamformed signal in a one-to-one relationship, each separator comprising a trained neural network producing E spectrally filtered outputs from its coupled beamformed signal, wherein the trained neural network produces one or more masks that separate out audio sources in the beamformed signal; and creating a plurality of spectrally filtered outputs from the plurality of beamformed signals using the separators.

2. The method of claim 1 further comprising:

selecting a subset of the plurality of spectrally filtered outputs based on a quality metric.

3. The method of claim 2 wherein a number of outputs that comprise the subset equals a number of audio sources received via the plurality of microphones.

4. The method of claim 2 wherein selecting the subset comprises:

calculating an affinity matrix between a magnitude spectrogram corresponding to each spectrally filtered output of the separators by their Pearson correlation;

grouping columns of the affinity matrix into C+1 clusters using spectral clustering; and selecting C outputs from the clusters having a highest speech quality metric.

5. The method of claim 4 wherein the speech quality metric is computed using a mean to standard deviation criteria.

6. The method of claim 1 wherein E equals 2.

7. The method of claim 1 wherein the plurality of beamformed signals are created using differential beamforming.

8. The method of claim 1 wherein the trained neural network is an Anchored Deep Attractor Network.

9. The method of claim 1 wherein the trained neural network comprises:

a Deep Attractor network;

a Deep Clustering network; or a Permutation Invariant Training network.

10. A system comprising:

a microphone array comprising a plurality of microphones arranged at spatially different locations;

a beamformer coupled to the microphone array, the beamformer receiving a plurality of audio signals from the microphone array and producing a plurality spatially filtered audio channels, each channel corresponding to a different directional beam; and a plurality of separators, each separator comprising a trained neural network coupled to a corresponding spatially filtered audio channel of the beamformer in a one-to-one relationship, each separator producing E spectrally filtered outputs corresponding to E audio sources separated for that separator, wherein the trained neural network produces one or more masks that separate out audio sources in the corresponding spatially filtered audio channel.

11. The system of claim 10 wherein the beamformer is a differential beamformer.

12. The system of claim 10 wherein the beamformer is a fixed beamformer unit.

13. The system of claim 10 wherein the trained neural network is an Anchored Deep Attractor Network.

14. The system of claim 10 further wherein the trained neural network comprises:

a Deep Attractor network;

a Deep Clustering network; or a Permutation Invariant Training network.

15. The system of claim 10 further comprising:

a post selection processor to select C audio sources from the audio sources produced by the combined separators based on a speech quality metric.

16. The system of claim 15 wherein the post selection processor comprises acts of:

calculating an affinity matrix between a magnitude spectrogram corresponding to each output signal of the separators by their Pearson correlation;

grouping columns of the affinity matrix into C+1 clusters using spectral clustering; and selecting C outputs from the clusters having a highest speech quality metric.

17. The system of claim 16 wherein the speech quality metric is computed using a mean to standard deviation criteria.

18. The system of claim 10 wherein E equals 2.

19. A non-transitory computer storage medium comprising executable instructions that, when executed by a processor of a machine, cause the machine to perform acts comprising:

receive audio input from a plurality of microphones;

create a plurality of beamformed signals from the received audio input using a beamformer so that each beamformed signal corresponds to a different direction;

create a plurality of spectrally filtered outputs from the plurality of beamformed signals using a plurality of separators, each separator comprising a trained neural network, each separator coupled to a corresponding one of the plurality of beamformed signals in a one-to-one relationship, each separator producing E spectrally filtered outputs from a single beamformed signal, wherein the trained neural network produces one or more masks that separate out audio sources in the single beamformed signal; and select a subset of the plurality of spectrally filtered outputs based on a quality metric.

20. The medium of claim 19 wherein selecting the subset comprises:

calculate an affinity matrix between a magnitude spectrogram corresponding to each spectrally filtered output of the separators by their Pearson correlation;

group columns of the affinity matrix into C+1 clusters using spectral clustering; and select C outputs from the clusters having a highest speech quality metric.

* * * * *